(12) United States Patent
Schmid et al.

(10) Patent No.: US 8,988,461 B1
(45) Date of Patent: Mar. 24, 2015

(54) 3D DRAWING AND PAINTING SYSTEM WITH A 3D SCALAR FIELD

(75) Inventors: Johannes Schmid, Zürich (CH); Martin Sebastian Senn, Schaffhausen (CH); Markus Gross, Uster (CH); Robert Sumner, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 453 days.

(21) Appl. No.: 13/353,249

(22) Filed: Jan. 18, 2012

Related U.S. Application Data

(60) Provisional application No. 61/433,967, filed on Jan. 18, 2011, provisional application No. 61/487,684, filed on May 18, 2011.

(51) Int. Cl.
   *G09G 5/00* (2006.01)
   *G06T 15/50* (2011.01)
   *G06T 15/60* (2006.01)

(52) U.S. Cl.
   USPC .......................... 345/629; 345/426; 345/582

(58) Field of Classification Search
   CPC ....... G06T 11/203; G06T 17/00; G06T 19/20; G06T 2219/2021; G06T 19/00; G06T 11/20; G06T 15/02; G06T 7/0089; G06T 2200/08; G06T 17/50
   See application file for complete search history.

(56) References Cited

U.S. PATENT DOCUMENTS

| | | |
|---|---|---|
| 3,521,227 A | 7/1970 | Hideki et al. |
| 4,953,142 A | 8/1990 | Rimmer |
| 5,347,620 A | 9/1994 | Zimmer |
| 5,414,801 A | 5/1995 | Smith et al. |
| 5,611,036 A | 3/1997 | Berend et al. |
| 5,870,097 A | 2/1999 | Snyder et al. |
| 6,011,536 A | 1/2000 | Hertzmann et al. |
| 6,054,991 A | 4/2000 | Crane et al. |
| 6,111,582 A | 8/2000 | Jenkins |
| 6,130,676 A | 10/2000 | Wise et al. |
| 6,266,064 B1 | 7/2001 | Snyder |
| 6,268,865 B1 * | 7/2001 | Daniels et al. ................ 345/582 |
| 6,590,574 B1 | 7/2003 | Andrews |

(Continued)

OTHER PUBLICATIONS

Guo et al; Point Set Surface Editing Techniques Based on Level-Sets; Proceedings of the Computer Graphics International, pp. 52-59; IEEE Computer Society Washington, DC, USA; 2004.*

(Continued)

*Primary Examiner* — Carlos Perromat
(74) *Attorney, Agent, or Firm* — Kilpatrick Townsend & Stockton LLP

(57) ABSTRACT

Rendering 3D paintings can be done by compositing strokes embedded in space. Users input strokes and other image elements using an input device that specifies a 2D view of the element, and the system provides the 3D position of the element based on rules and processes, some of which allow for user input of high level parameters, thereby allowing for intuitive and quick entry of 3D elements, and a 3D scalar field. The artist can treat the full 3D space as a canvas. Strokes painted in a 2D viewport window are embedded in 3D space in a way that gives creative freedom to the artist while maintaining an acceptable level of controllability. The canvas need not be tied to any particular object already in a scene, but the canvas can be dependent on, or a function of, another object. An implicit canvas can be defined by the 3D scalar field.

23 Claims, 15 Drawing Sheets
(14 of 15 Drawing Sheet(s) Filed in Color)

(56) References Cited

U.S. PATENT DOCUMENTS

| | | | |
|---|---|---|---|
| 6,965,454 B1 | 11/2005 | Silverbrook et al. | |
| 7,064,771 B1 | 6/2006 | Jouppi et al. | |
| 7,190,376 B1 | 3/2007 | Tonisson | |
| 7,382,378 B2 | 6/2008 | Levene et al. | |
| 7,403,661 B2 | 7/2008 | Curry et al. | |
| 7,746,344 B2 | 6/2010 | Grabli et al. | |
| 7,924,284 B2 | 4/2011 | Ewanchuk et al. | |
| 8,345,998 B2 | 1/2013 | Malik et al. | |
| 8,373,715 B1* | 2/2013 | Ryu | 345/581 |
| 2002/0130864 A1* | 9/2002 | Perry et al. | 345/421 |
| 2002/0175925 A1 | 11/2002 | Lie | |
| 2003/0222868 A1* | 12/2003 | Raskar et al. | 345/419 |
| 2004/0125103 A1 | 7/2004 | Kaufman et al. | |
| 2005/0093874 A1 | 5/2005 | Levene et al. | |
| 2005/0151755 A1 | 7/2005 | Bentley et al. | |
| 2005/0168476 A1 | 8/2005 | Levene et al. | |
| 2005/0231516 A1 | 10/2005 | Zimmer | |
| 2005/0248560 A1 | 11/2005 | Agrawala et al. | |
| 2006/0072828 A1 | 4/2006 | Silverbrook et al. | |
| 2006/0244748 A1 | 11/2006 | Long et al. | |
| 2007/0176929 A1 | 8/2007 | Grabli et al. | |
| 2008/0008387 A1 | 1/2008 | Cheng et al. | |
| 2009/0102857 A1 | 4/2009 | Kallio | |
| 2009/0201288 A1 | 8/2009 | Fischer et al. | |
| 2009/0225081 A1 | 9/2009 | Keller et al. | |
| 2009/0226080 A1 | 9/2009 | Boyd et al. | |
| 2010/0022879 A1 | 1/2010 | Migita | |
| 2010/0085357 A1 | 4/2010 | Sullivan et al. | |
| 2010/0164956 A1 | 7/2010 | Hyndman et al. | |
| 2010/0194768 A1* | 8/2010 | Schrag | 345/584 |
| 2010/0204971 A1 | 8/2010 | Yin et al. | |
| 2011/0075257 A1 | 3/2011 | Hua et al. | |
| 2011/0157155 A1 | 6/2011 | Turner et al. | |
| 2011/0175916 A1 | 7/2011 | Noris et al. | |
| 2011/0181606 A1 | 7/2011 | Sumner et al. | |
| 2011/0261427 A1 | 10/2011 | Hart et al. | |
| 2011/0285910 A1 | 11/2011 | Bamji et al. | |
| 2012/0081357 A1 | 4/2012 | Habbecke et al. | |
| 2012/0229463 A1 | 9/2012 | Yeh et al. | |

OTHER PUBLICATIONS

Baerentzen, J. A., et al., "Signed distance computation using the angle weighted pseudonormal," IEEE Transactions on Visualization and Computer Graphics, May 2005, vol. 11 pp. 243-253.
Baxter, W., et al., "Project Gustav: Immersive digital painting," ACM SIGGRAPH 2010 Talks, 2010, ACM, 1 page.
Bernhardt, A., et al., "Matisse: Painting 2D regions for modeling free-form shapes," Eurographics Workshop on Sketch-Based Interfaces and Modeling, 2008, pp. 57-64.
Booker, P., "A history of engineering drawing," Chatto & Windus, 1963.
Bourguignon, D., et al., "Drawing for illustration and annotation in 3d," Computer Graphics Forum 2001, vol. 20, No. 3, pp. 114-122.
Bousseau, A., et al., "Interactive watercolor rendering with temporal coherence and abstraction," Proceedings of the 4th international symposium on Non-photorealistic animation and rendering, 2006, pp. 141-149.
Cohen, J. M., et al., "Harold: A world made of drawings," Proceedings of the 1st International Symposium on Non-Photorealistic Animation and Rendering, 2000, pp. 83-90.
Durand, F., "An invitation to discuss computer depiction," Proceedings of the 2nd international symposium on Non-photorealistic animation and rendering, 2002, pp. 111-124.
Frisken, S. F., et al., "Adaptively sampled distance fields: A general representation of shape for computer graphics," Proceedings of ACM SIGGRAPH 2000, Computer Graphics Proceedings, Annual Conference Series, 2000, pp. 249-254.
Gottschalk, S., et al., "Obbtree: A hierarchical structure for rapid interference detection," Proceedings of SIGGRAPH 96, Computer Graphics Proceedings, Annual Conference Series, 1996, pp. 171-180.
Haeberli, P.E., "Paint by numbers: Abstract image representations," Computer Graphics (Proceedings of SIGGRAPH 90), 1990, pp. 207-214.
Hart, J. C., "Sphere tracing: A geometric method for the antialiased ray tracing of implicit surfaces," The Visual Computer, 1994, vol. 12, pp. 527-545.
Hertzmann, A., "A survey of stroke-based rendering. Computer Graphics and Applications," IEEE, Jul.-Aug. 2003, vol. 23, No. 4, pp. 70-81.
Igarashi, T., et al., "Teddy: A sketching interface for 3d freeform design," Proceedings of SIGGRAPH 99, Computer Graphics Proceedings, Annual Conference Series, 1999, pp. 409-416.
Judd, T., et al., "Apparent ridges for line drawing," ACM Transactions on Graphics, Jul. 2007, vol. 26, No. 3, 7 pages.
Kalnins, R. D., et al., "WYSIWYG npr: Drawing strokes directly on 3d models," ACM Transactions on Graphics, Jul. 2002, vol. 21, No. 3, pp. 755-762.
Karpenko, O., et al., "Free-form sketching with variational implicit surfaces," Computer Graphics Forum, 2002, vol. 21, No. 3, pp. 585-594.
Keefe, D. F., et al., "Cavepainting: a fully immersive 3d artistic medium and interactive experience," Proceedings of the 2001 symposium on Interactive 3D graphics, 2001, ACM, pp. 85-93.
Keefe, D., et al., "Drawing on air: Input techniques for controlled 3d line illustration," IEEE Transactions on Visualization and Computer Graphics, 2007, vol. 13, pp. 1067-1081.
Kowalski, M. A., et al., "Art-based rendering of fur, grass, and trees," Proceedings of SIGGRAPH '99, Computer Graphics Proceedings, Annual Conference Series, 1999, pp. 433-438.
Lu, J., et al., "Interactive painterly stylization of images, videos and 3d animations," Proceedings of the 2010 ACM SIGGRAPH symposium on Interactive 3D Graphics and Games, 2010, pp. 127-134.
Markosian, L., et al., Real-time nonphotorealistic rendering. In Proceedings of SIGGRAPH 97, Computer Graphics Proceedings, Annual Conference Series, 1997, pp. 415-420.
Markosian, L., et al., "Art-based rendering with continuous levels of detail," Proceedings of the 1st international symposium on Non-photorealistic animation and rendering, 2000, pp. 59-66.
"Maya, 3D Animation Software," by Autodesk (referenced at http://www.autodesk.com/maya), product overview retrieved from internet, 2 pages, May 10, 2013.
Meier, B. J., Painterly rendering for animation. In Proceedings of SIGGRAPH '96, Computer Graphics Proceedings, Annual Conference Series, 1996, pp. 477-484.
Mudbox, 3D Digital Sculpting & Digital Painting Software, by Autodesk (referenced at http://www.autodesk.com/mudbox) product overview retrieved from internet, 2 pages, May 10, 2013.
Nealen, A., et al., "Fibermesh: Designing freeform surfaces with 3d curves," ACM Transactions on Graphics, Jul. 2007, vol. 26, No. 3, 9 pages.
"Paint Effects, Painting in 3D using paint effects," Autodesk Maya Learning Resources (referenced at http://autodesk.com/us/maya/2011help/index.html) product overview retrieved from internet, 1 page, May 10, 2013.
Peng, J., et al. "Interactive modeling of topologically complex geometric detail," ACM Transactions on Graphics, Aug. 2004, vol. 23, No. 3, pp. 635-643.
Praun, E., et al., "Real-time hatching," Proceedings of ACM SIGGRAPH 2001, Computer Graphics Proceedings, Annual Conference Series, 2001, pp. 579-584.
Rademacher, P., "View-dependent geometry," Proceedings of SIGGRAPH '99, Computer Graphics Proceedings, Annual Conference Series, 1999, pp. 439-446.
Rivers, A., et al., "2.5d cartoon models," ACM Transactions on Graphics, Jul. 2010, vol. 29, No. 4, 7 pages.
Schkolne, S., et al., "Surface drawing: creating organic 3d shapes with the hand and tangible tools," Proceedings of the SIGCHI conference on Human factors in computing systems, 2001, ACM, pp. 261-268.
Schmidt, R., et al., "Shapeshop: Sketch-based solid modeling with blobtrees," Eurographics Workshop on Sketch-Based Interfaces and Modeling, 2005, pp. 53-62.

(56) References Cited

OTHER PUBLICATIONS

Teece, D., "Animating with expressive 3d brush strokes (animation abstract)," Proceedings of the 1st international symposium on Non-photorealistic animation and rendering, 2000, ACM.

Tolba, O., et al., "A projective drawing system," Proceedings of the 2001 symposium on Interactive 3D graphics, ACM 2001, pp. 25-34.

Willats, J., "Art and representation: new principles in the analysis of pictures," 1997, Princeton University Press.

Wyvill, G., et al., "Data structure for soft objects," The Visual Computer, 1986, vol. 2, No. 4, pp. 227-234.

"Zbrush software tools" (referenced at http://www.pixologic.com/zbrush/), product overview retrieved from Internet, 1 page, May 10, 2013.

Non-Final Office Action dated Feb. 6, 2015 in U.S. Appl. No. 13/475,617 75 pages.

* cited by examiner

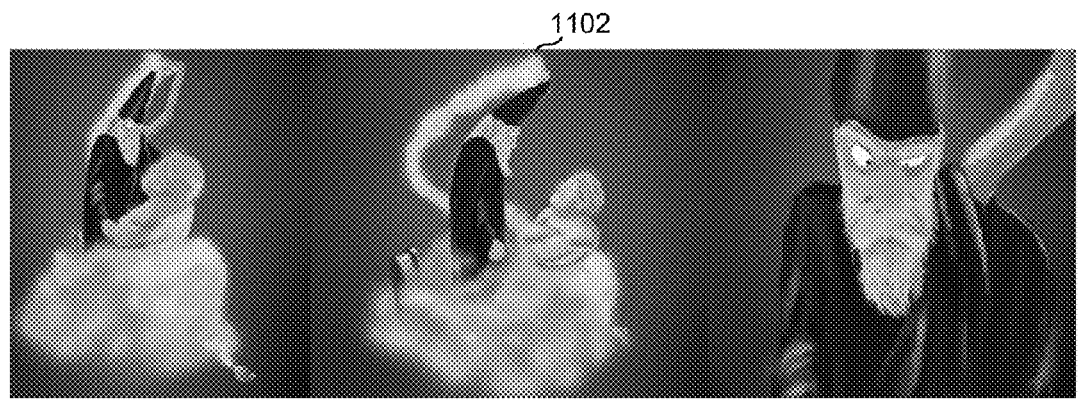
(a) (b) (c)
FIG. 11
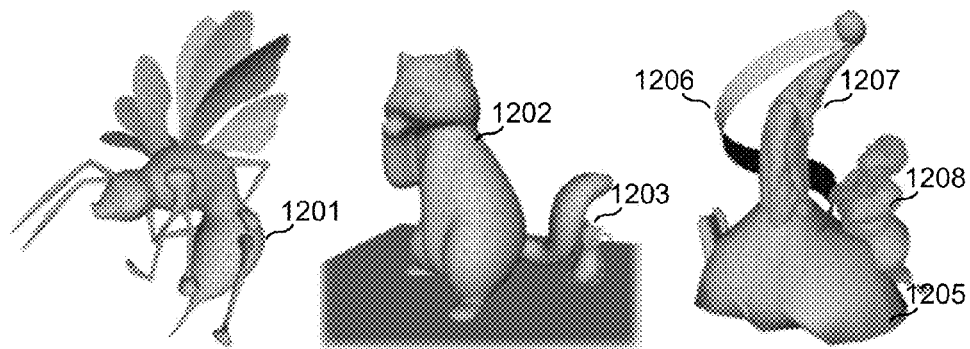
(a) (b) (c)
FIG. 12
| Example | Triangles | Strokes | Splats | Time |
|---|---|---|---|---|
| Autumn Tree | 29,000 | 21,000 | 138,000 | 270 ms |
| Captain Mattis | 6,600 | 5,000 | 40,000 | 70 ms |
| Cat and Mouse | 7,500 | 5,000 | 130,000 | 200 ms |
| Angry Bumble Bee | 6,300 | 20,000 | 304,000 | 370 ms |
| Wizard vs. Genie | 30,000 | 24,000 | 452,000 | 610 ms |
FIG. 13

3D DRAWING AND PAINTING SYSTEM WITH A 3D SCALAR FIELD

CROSS-REFERENCES TO RELATED APPLICATIONS

This application is a U.S. Non-Provisional Patent Application of U.S. Provisional Patent Application No. 61/433,967, filed Jan. 18, 2011, entitled "OVERCOAT: AN IMPLICIT CANVAS FOR 3D PAINTING", the entire disclosure of which is incorporated by reference herein for all purposes.

A related application is U.S. Provisional Patent Application No. 61/487,684, filed May 18, 2011, entitled "MIXED-ORDER COMPOSITING FOR IMAGES HAVING THREE-DIMENSIONAL PAINTING EFFECTS", the entire disclosure of which is incorporated by reference herein for all purposes.

FIELD OF THE INVENTION

The present invention relates generally to image generation and more specifically to image generation (whether individual images or animation sequences of images) based on elements that include simulated paint strokes represented in a three-dimensional space.

BACKGROUND

Traditional two-dimensional ("2D") painting techniques and digital 2D painting systems provide an artist with a lot of expressive freedom in the creation of a digital "painting," allowing a wide range of styles. Herein, "painting" or "a painting" refers to a process and/or an object or output that results from some input into a digital system such that the image is represented, or representable, by picture elements or objects that are electronically stored or storable. When an image is generated from the corresponding elements or objects, the elements or objects are considered in determining the colors of various pixels of the image. Of course, physically painting onto a physical surface or three-dimensional object and then taking a photograph of that work can be used to convey a painted scene, but there are many situations where it is desirable to allow artists and others to work with digital media and output a representation of what appears to be painting or some desired representation or approximation of painting. A collection of strokes embedded in space can be considered a "3D painting."

Translating the expressive freedom into three dimensions, so that paintings could be viewed from multiple angles or obtaining other benefits of a 3D representation, has been a research challenge for many years.

REFERENCES

[Baerentzen] Baerentzen, J. A., and Aanaes, H. 2005. Signed distance computation using the angle weighted pseudonormal. *IEEE Transactions on Visualization and Computer Graphics* 11 (May), 243-253.

[Baxter] Baxter, W., Chu, N., and Govindaraju, N. 2010. Project Gustav: Immersive digital painting. In *ACM SIGGRAPH 2010 Talks*, ACM, 41:1-41:1.

[Bernhardt] Bernhardt, A., Pihuit, A., Cani, M.-P., and Barthe, L. 2008. Matisse: Painting 2D regions for modeling freeform shapes. In Eurographics Workshop on Sketch-Based Interfaces and Modeling, 57-64.

[Booker] Booker, P. 1963. *A history of engineering drawing*. Chatto & Windus.

[Bourguignon] Bourguignon, D., Cani, M.-P., and Drettakis, G. 2001. Drawing for illustration and annotation in 3d. *Computer Graphics Forum* 20, 3, 114-122.

[Bousseau] Bousseau, A., Kaplan, M., Thollot, J., and Sillion, F. X. 2006. Interactive watercolor rendering with temporal coherence and abstraction. In *Proceedings of the 4th international symposium on Non-photorealistic animation and rendering*, 141-149.

[Cohen] Cohen, J. M., Hughes, J. F., and Zeleznik, R. C. 2000. Harold: A world made of drawings. In *Proceedings of the 1st International Symposium on Non-Photorealistic Animation and Rendering*, 83-90.

[Durand] Durand, F. 2002. An invitation to discuss computer depiction. In *Proceedings of the 2nd international symposium on Non-photorealistic animation and rendering*, 111-124.

[Frisken] Frisken, S. F., Perry, R. N., Rockwood, A. P., and Jones, T. R. 2000. Adaptively sampled distance fields: A general representation of shape for computer graphics. In *Proceedings of ACM SIGGRAPH 2000, Computer Graphics Proceedings, Annual Conference Series*, 249-254.

[Gottschalk] Gottschalk, S., Lin, M. C., and Manocha, D. 1996. Obbtree: A hierarchical structure for rapid interference detection. In *Proceedings of SIGGRAPH 96, Computer Graphics Proceedings, Annual Conference Series*, 171-180.

[Haeberli] Haeberli, P. E. 1990. Paint by numbers: Abstract image representations. In *Computer Graphics (Proceedings of SIGGRAPH 90)*, 207-214.

[Hart] Hart, J. C. 1994. Sphere tracing: A geometric method for the antialiased ray tracing of implicit surfaces. *The Visual Computer* 12, 527-545.

[Hertzmann] Hertzmann, A. 2003. A survey of stroke-based rendering. *Computer Graphics and Applications*, IEEE 23, 4 (July-August) 70-81.

[Igarashi] Igarashi, T., Matsuoka, S., and Tanaka, H. 1999. Teddy: A sketching interface for 3d freeform design. In *Proceedings of SIGGRAPH 99, Computer Graphics Proceedings, Annual Conference Series*, 409-416.

[Judd] Judd, Durand, F., and Adelson, E. 2007. Apparent ridges for line drawing. *ACM Transactions on Graphics* 26, 3 (July), 19:1-19:7.

[Kalnins] Kalnins, R. D., Markosian, L., Meier, B. J., Kowalski, M. A., Lee, J. C., Davidson, P. L., Webb, M., Hughes, J. F., and Finkelstein, A. 2002. Wysiwyg npr: Drawing strokes directly on 3d models. *ACM Transactions on Graphics* 21, 3 (July), 755-762.

[Karpenko] Karpenko, 0., Hughes, J. F., and Raskar, R. 2002. Free-form sketching with variational implicit surfaces. *Computer Graphics Forum* 21, 3, 585-594.

[Katanics] Katanics, G., and Lappas, T. 2003. Deep Canvas: Integrating 3D Painting and Painterly Rendering. In *Theory and Practice of Non-Photorealistic Graphics: Algorithms, Methods, and Production Systems*, ACM SIGGRAPH 2003 Course Notes.

[Keefe] Keefe, D. F., Feliz, D. A., Moscovich, T., Laidlaw, D. H., and Laviola, J R., J. J. 2001. Cavepainting: a fully immersive 3d artistic medium and interactive experience. In Proceedings of the 2001 symposium on Interactive 3D graphics, ACM, 85-93.

[Keefe] Keefe, D., Zeleznik, R., and Laidlaw, D. 2007. Drawing on air: Input techniques for controlled 3d line illustration. *IEEE Transactions on Visualization and Computer Graphics* 13, 1067-1081.

[Kowalski] Kowalski, M. A., Markosian, L., Northrup, J. D., Bourdev, L., Barzel, R., Holden, L. S., and Hughes, J. F. 1999. Art-based rendering of fur, grass, and trees. In *Proceedings of SIGGRAPH '99, Computer Graphics Proceedings, Annual Conference Series, 433-438.

[Lu] Lu, J., Sander, P. V., and Finkelstein, A. 2010. Interactive painterly stylization of images, videos and 3d animations. In *Proceedings of the 2010 ACM SIGGRAPH symposium on Interactive 3D Graphics and Games*, 127-134.

[Markosian1997] Markosian, L., Kowalski, M. A., Trychin, S. J., Bourdev, L. D., Goldstein, D., and Hughes, J. F. 1997. Real-time nonphotorealistic rendering. In *Proceedings of SIGGRAPH 97*, Computer Graphics Proceedings, Annual Conference Series, 415-420.

[Markosian2000] Markosian, L., Meier, B. J., Kowalski, M. A., Holden, L. S., Northrup, J. D., and Hughes, J. F. 2000. Art-based rendering with continuous levels of detail. In *Proceedings of the 1st international symposium on Non-photorealistic animation and rendering*, 59-66.

[Maya] Maya, 3D Animation Software, by Autodesk (referenced at http://www.autodesk.com/maya).

[Meier] Meier, B. J. 1996. Painterly rendering for animation. In *Proceedings of SIGGRAPH '96*, Computer Graphics Proceedings, Annual Conference Series, 477-484.

[Mudbox] Mudbox, 3D Digital Sculpting & Digital Painting Software, by Autodesk (referenced at http://www.autodesk.com/mudbox).

[Nealen] Nealen, A., Igarashi, T., Sorkine, 0., and Alexa, M. 2007. Fibermesh: Designing freeform surfaces with 3d curves. *ACM Transactions on Graphics* 26, 3 (July), 41:1-41:9.

[Paint Effects] Paint Effects, Painting in 3D using paint effects. In *Autodesk Maya Learning Resources* (referenced at http://autodesk.com/us/maya/2011help/index.html).

[Peng] Peng, J., Kristjansson, D., and Zorin, D. 2004. Interactive modeling of topologically complex geometric detail. *ACM Transactions on Graphics* 23, 3 (August), 635-643.

[Praun] Praun, E., Hoppe, H., Webb, M., and Finkelstein, A. 2001. Real-time hatching. In *Proceedings of ACM SIGGRAPH 2001*, Computer Graphics Proceedings, Annual Conference Series, 579-584.

[Rademacher] Rademacher, P. 1999. View-dependent geometry. In *Proceedings of SIGGRAPH '99*, Computer Graphics Proceedings, Annual Conference Series, 439-446.

[Rivers] Rivers, A., Igarashi, T., and Durand, F. 2010. 2.5d cartoon models. *ACM Transactions on Graphics* 29, 4 (July), 59:1-59:7.

[Schkolne] Schkolne, S., Pruett, M., and Schröder, P. 2001. Surface drawing: creating organic 3d shapes with the hand and tangible tools. In *Proceedings of the SIGCHI conference on Human factors in computing systems*, ACM, 261-268.

[Schmidt] Schmidt, R., Wyvill, B., Sousa, M., and Jorge, J. 2005. Shapeshop: Sketch-based solid modeling with blobtrees. In *Eurographics Workshop on Sketch-Based Interfaces and Modeling*, 53-62.

[Teece] Teece, D. 2000. Animating with expressive 3d brush strokes (animation abstract). In *Proceedings of the 1 st international symposium on Non-photorealistic animation and rendering*, ACM.

[Tolba] Tolba, O., Dorsey, J., and Mcmillan, L. 2001. A projective drawing system. In *Proceedings of the 2001 symposium on Interactive 3D graphics*, ACM, 25-34.

[Willats] Willats, J. 1997. *Art and representation: new principles in the analysis of pictures*. Princeton University Press.

[Wyvill] Wyvill, G., Mcpheeters, C., and Wyvill, B. 1986. Data structure for soft objects. *The Visual Computer* 2, 4, 227-234.

[Zbrush] Zbrush software tools (referenced at http://www.pixologic.com/zbrush/).

BRIEF SUMMARY

In embodiments of drawing and painting systems, artists and other users input strokes and other image elements using an input device, wherein the input device specifies a 2D view of the element, and the system provides the 3D position of the element based on rules and processes, some of which allow for user input of high level parameters, thereby allowing for intuitive and quick entry of 3D elements.

In a specific embodiment, an artist uses an input device for 2D painting that allows the artist to treat the full 3D space as a canvas. Strokes painted in a 2D viewport window are embedded in 3D space in a way that gives creative freedom to the artist while maintaining an acceptable level of controllability. The canvas need not be tied to any particular object already in a scene, but the canvas can be dependent on, or a function of, another object.

In a specific embodiment, a canvas is defined by a 3D scalar field. The canvas might be thought of as an implicit canvas that a user or artist can shape by creating approximate 3D geometry or otherwise generating a 3D scalar field. An optimization procedure is then used to embed painted strokes in space by satisfying different objective criteria defined on the scalar field. This allows for painting along level set surfaces or across different level sets.

In defining an implicit canvas, the artist can "draw" the canvas, i.e., rather than adding color, tools create a local change in the scalar field that results in outward or inward protrusions along the field's gradient direction.

Rendering 3D paintings can be done by compositing strokes embedded in space. Image elements are rendered into an image representable by a pixel array wherein at least some of the image elements correspond to simulated paint strokes.

In some embodiments, efficient rendering uses a graphics processing unit ("GPU") implementation of brush models for interactive rendering. The drawing and painting systems use computer processing to handle some of the input and output. The visibility ambiguity inherent in 3D stroke rendering can be handled with a depth offsetting method that may use hardware acceleration.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 11 illustrates other aspects of an embedding process.

FIG. 12 illustrates proxy geometries used for various embedding operations illustrated by other figures.

FIG. 13 is a table of test results.

DETAILED DESCRIPTION

Figure 1:
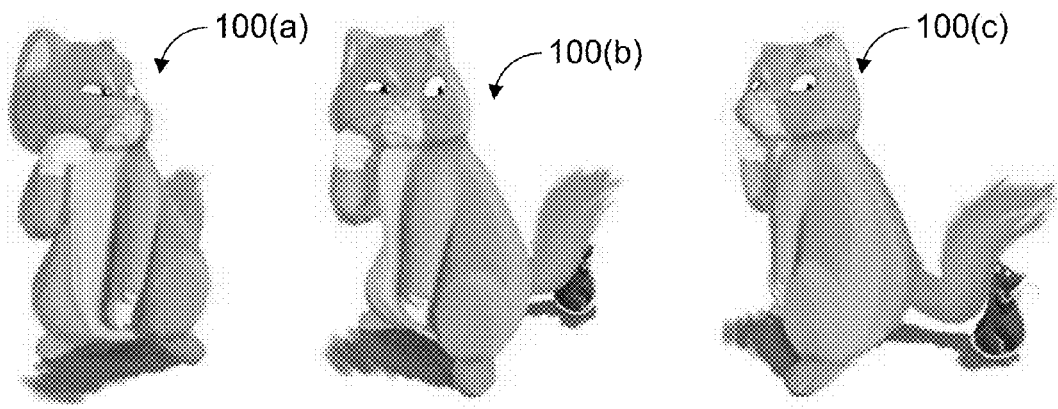
FIG. 1 illustrates an example of a drawing done with paint stroke tools and three different view angles on the drawing.

An improved computer-generated image generation system is described herein. Such a system can be used to create single images or animated sequences of images. In particular, the images are generated from three-dimensional (3D) geometric models. As used herein, a geometric model is a computer-based, electronically readable representation of objects that have positions in a virtual 3D space. The objects can be representations of some physical object or of objects with no physical world counterpart. The objects can be things, light sources, atmospheric effects, and other things that affect a view. Typically, the view is from a camera viewpoint through a view plane, but other variations are possible, such as a view from two points for 3D imagery or a nonplanar view surface. This disclosure is not intended to be limited to any particular process of rendering or image generation from the geometric model.

Prior to the advent of computers, an artist wishing to paint a particular view would apply paint or some other substance onto a canvas, as an ordered set of strokes and the resulting image would be the sum effect of all of those strokes. Of course, some strokes might have no effect on the final view if they were totally covered by later strokes, but generally some set of strokes in effect defines a view. The typical painter's canvas is a 2D object, such as stretched cloth. Strokes have shapes and positions in the 2D canvas space, in addition to a stroke order, brush characteristics, paint characteristics, etc.

Working directly with brushes and paint to fill the canvas gives the artist full creative freedom of expression, evidenced by the huge variety of styles that have been explored through art's rich history. Modern digital painting software using computer processing can emulate the traditional painting metaphor while further empowering the artist with control over layering, compositing, filtering, and other digital effects. As a result, digital artists have an extremely powerful, flexible, and expressive toolset for creating 2D digital paintings.

When the painter is painting a single view, from a single direction, 2D painting might be enough. However, sometimes, painters using computers will want to paint in three dimensions. Thus, instead of merely specifying (by physical act of putting brush to canvas or by physical act of providing a computer input) a location, orientation, etc. of a brush stroke in two dimensions, an artist might want to perform "3D painting" wherein at least some of the strokes have a third dimension specified.

One approach for 3D digital painting is to use texture painting or other methods that project stroke centerlines onto another object's surface. The mathematical nature of such a process can betray the underlying 3D structure of the scene, leading to a "gift-wrapped" appearance. Typically, structures such as fur, hair, or smoke were addressed using special-purpose modeling software without the direct control afforded by painting. These limitations ultimately restrict the variety of styles possible with 3D digital painting and may hinder the artist's ability to realize their creative vision.

Using techniques and system described herein, the 2D painting metaphor can be generalized to 3D, allowing an artist to treat the full 3D space as a canvas. Strokes painted in the 2D viewport window are "embedded" in 3D space in a way that gives creative freedom to the artist while maintaining an acceptable level of controllability. As explained in more detail below, a drawing system can process the embedding of strokes according to a "canvas" defined implicitly by a 3D scalar field.

When the artist paints a stroke in 2D and it is embedded into 3D, that might result in different parts of the stroke being different distances from a camera point. Where parts of the stroke are further from the camera than other parts of the stroke, a renderer might attempt to keep splats (or components) of the stroke looking the same size in the rendered image even though some of them are further away from the camera and would have otherwise been smaller.

The term "3D scalar field" refers to a set of values for points in the virtual 3D space. A simple 3D scalar field might be the temperature at each point in a three-dimensional room or a 3D scalar field that is valued at each point according to the distance from that point to an origin point. In computer graphics, the room is a virtual room, a 3D space into which objects, lights, effects, etc. are placed. So, the 3D scalar field provides a scalar value at each point in the virtual 3D space where imagery is being placed. There are many ways to create a 3D scalar field and many are well-known. For example, the artist might pull one out of a database, or create one based on the outlines of objects in a scene. The 3D scalar field might be a property of the space/room into which the artist is placing objects and strokes.

The artist can shape the implicit canvas by creating approximate 3D proxy geometry, or starting with a blank field or other techniques described herein. An optimization procedure is then used to embed painted strokes in space by satisfying different objective criteria defined on the scalar field. The drawing system might include tools for painting along level set surfaces or in gradient directions. This fine-tuning of the implicit canvas might provide a unified painting/sculpting metaphor.

A sculpting tool can be used to paint into the implicit canvas. Rather than adding color, this tool creates a local change in the scalar field that results in outward or inward protrusions along the field's gradient direction.

Also explained in more detail herein is approaches for a GPU implementation of brush models for interactive rendering.

FIG. 1 is a set of views of a 3D painting created using techniques described herein. Note that FIGS. 1(a), 1(b) and 1(c) are from different viewpoints in a virtual 3D space. However, since the brush strokes that make up the cat, mouse, shadows, etc. are specified in three dimensions, three separate 2D drawings were not needed to make up FIG. 1. One 3D drawing is sufficient, as the brush strokes are specified in three dimensions, so the different views of FIG. 1 only require a change of camera viewpoint. With painted strokes having 3D coordinates, each new view can be rendered by "repainting" (e.g., playing back) the recorded painting operations, using the camera's new view transformation. Since the painting strokes need only be constrained by a 3D scalar field and objective conditions, wide variations of artistic expression are possible.

Strokes are not required to be brush tool inputs, as other tools might be used instead. For example, some input devices might be used to input lines, ribbons, and/or other elements, which might be handled in the same way as strokes from a brush tool. For example, strokes can be brush strokes, pen strokes, pencil strokes, input lines, marks made by the user, image elements and other input elements.

In the examples herein, the person performing data entry of strokes might be referred to as an artist, a user, a painter, etc. depending on context. Unless otherwise specified, it should be understood that these are interchangeable labels. For example, if it is explained herein that user input is accepted by an artist editing system, it is not meant to exclude 3D painting by a person who would not consider themselves an artist. Thus, "artist" can refer to any user that provides input, such as a graphic artist, an animator, a director, a cinematographer, their assistants, etc.

One approach to 3D painting is to provide the painter with a 3D positioning and/or data entry system. For example, the painter might paint with a 3D mouse. A 3D mouse is a pointing device that provides position information such as a left-right position, an up-down position and a depth position, whereas a more common 2D mouse provides only a left-right position and an up-down position. However, 3D mice might make the painting process less intuitive and might not be common enough to be useful. It might also be that the hardware being used to generate images does not support 3D mice or other 3D input devices.

A better approach is to use strokes painted on a 2D surface such as from a 2D input device and embed them into the virtual 3D space. The "canvas" for such painting might be an editing display with input devices, a touch screen, or the like. Preferably, strokes painted in a 2D viewport window are embedded in 3D space in a way that gives creative freedom to the artist while maintaining an acceptable level of control.

Hardware for Implementing an Image Generation System

Figure 2:
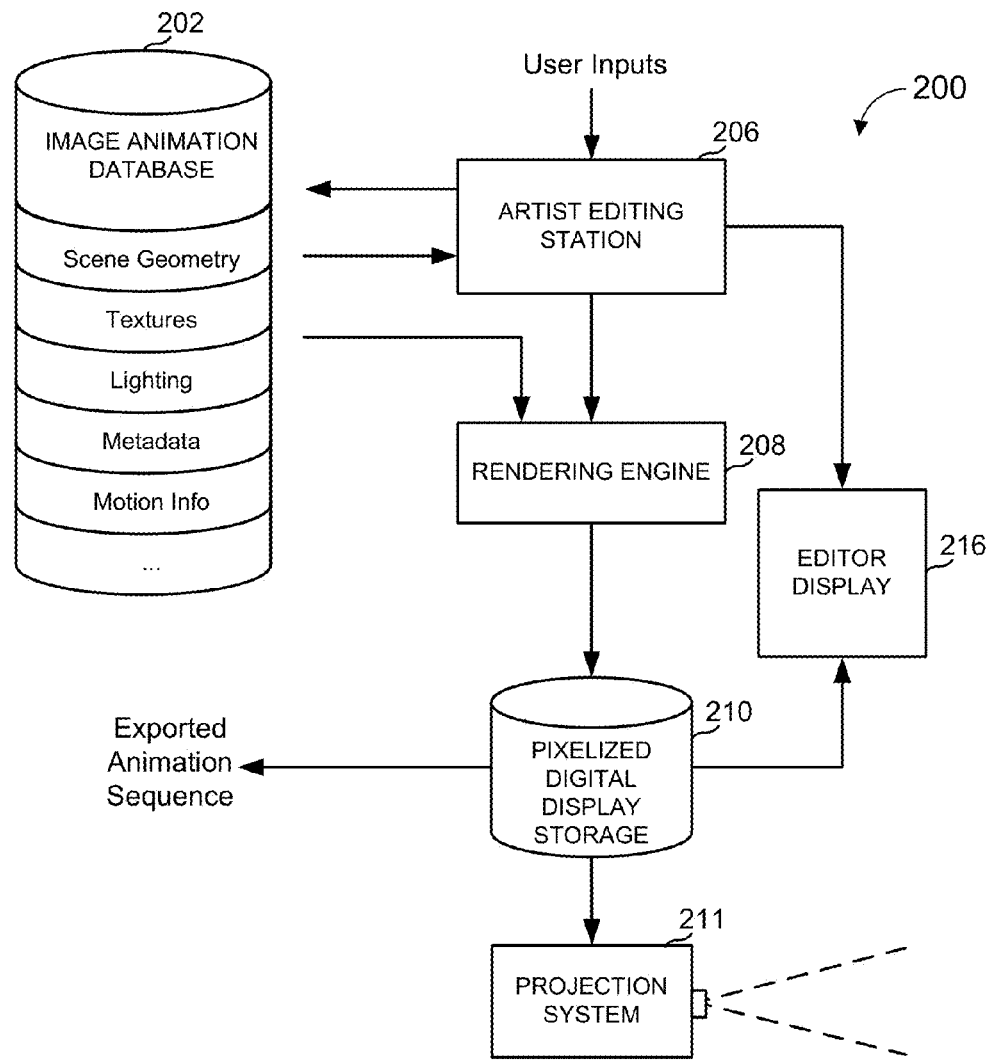
FIG. 2 illustrates elements of an editing and production system that supports stroke embedding tools.

FIG. 2 illustrates an image generation system 200 for creating, modifying, and presenting images and/or animation, comprising an image/animation database 202 that contains the particulars of a scene from which one or more images and/or animation is to be generated. Also shown is an artist editing station 206, a rendering engine 208, a pixelized digital display storage 210, a projection system 211, and an editor display 216. It should be understood that some of these elements can be implemented in software, hardware or a combination of hardware and software. The software could be separate modules or a larger system having several functions. Also, one or more of these elements could include (often not shown) memory, inputs, outputs, input devices and output devices for human, computer or electronic interfaces. It should be apparent from a reading of this description, that many of these elements can be implemented as a general purpose computer executing program code, while accepting inputs and issuing outputs and storing, reading and writing to memory allocated to that program code.

It should also be understood that not all of these elements are required. For example, it may be that the artist can fully create and specify an image without having to have seen a rendering result, in which case perhaps rendering is not needed until the final product is to be shown.

In the embodiment shown in FIG. 2, artist editing station 206 receives various inputs and generates parameters, 3D scalar fields, strokes, and other details used in an image. In one embodiment, image/animation database 202 includes a collection of object descriptions (the scene geometry, 3D objects, 2D strokes), textures, lighting, motion information, etc. For example, image/animation database 202 might include storage for a collection of objects that are parts of a character and storage for motion information describing how each of those objects moves from frame to frame. In an extremely simple case, the database might indicate that the scene geometry includes a textured, static background, a blue cube having an edge length of 4 units of length in the virtual space, and motion data to indicate that the cube does not rotate but translates 2 units up and 2 unit to the left for three frames, then stops and drops with a specified rotation for the next 20 frames, with fur that starts 3.5 units from the surface of the cube and extends away from the starting point a sufficient distance in three dimensions so that its end point coincides with the view ray through the end point the artist provided on a 2D input device and its mapping to the 2D viewport. Additionally, image/animation database 202 might include metadata not about the scenes to be generated, per se, but information about how the other data was generated and/or edited, for use in subsequent processing steps and/or editing steps.

The image/animation data might be implemented in any manner of data structure and/or storage, and need not be stored in a highly-structured database management system, so long as the image/animation data is electronically readable.

Artist editing station 206 might be an appropriately programmed general purpose computer, with input devices and display(s), such as an editor display 216 that an artist can use to obtain feedback as he/she enters paint strokes. Rendering engine 208 can read details from image/animation database 202 and produce pixelized digital display data that is stored in storage 210. Rendering engine 208 can run in real-time or not. The pixelized digital display can be in a raw form, such as a 2D pixel array with dimensions specified by a maximum resolution (e.g., 2920×2280, 2280×720), with each element of the array representing a pixel color value (often three or four "component" values). The pixelized digital display data might also be compressed, but the storage format need not be detailed here.

It may be the case that editor display 216 is of lower resolution and/or of lower quality than the underlying represented data. This might be useful in interactive editing, where it is not necessary to interactively generate to the final quality in order to allow the artist to work with the images. The pixelized digital display data is readable by projection system 211, which then can project the image or image sequences for viewing.

In many cases, an animation is created by one entity, such as a filmmaker, and the pixelized digital display data is distributed to a presenter in the form of digital transmission, storage on medium and transported to the presenter, such as a theater proprietor, DVDs transported and sold to end customers for small-scale viewing, medium provided to broadcasters, etc. As such, the generation of the animation might be done by one party independently of what a recipient of the medium and/or transmission does for the presentation. However, the animation process might be informed by actual or presumed details of how the presentation is to occur. As one example, the compensation might vary for varying projectors. As another example, the resolution and color depth might vary at the rendering engine 208 (and/or elsewhere) based on formats used by presenters (such as DVD formats, vs. standard broadcast format, vs. theatre presentation).

In operation, multiple artists and others might edit data in multiple rounds until the acceptable images are achieved. In some embodiments, an artist editing station 206 might allow for multiple stages of editing. It should also be understood that while operations of artist editing station 206 are described in terms of paint strokes, artist editing station 206 might also provide for other, non-stroke, user inputs, such as inputs used to generate objects that do not look like they are "painted" into the scene.

Figure 3:
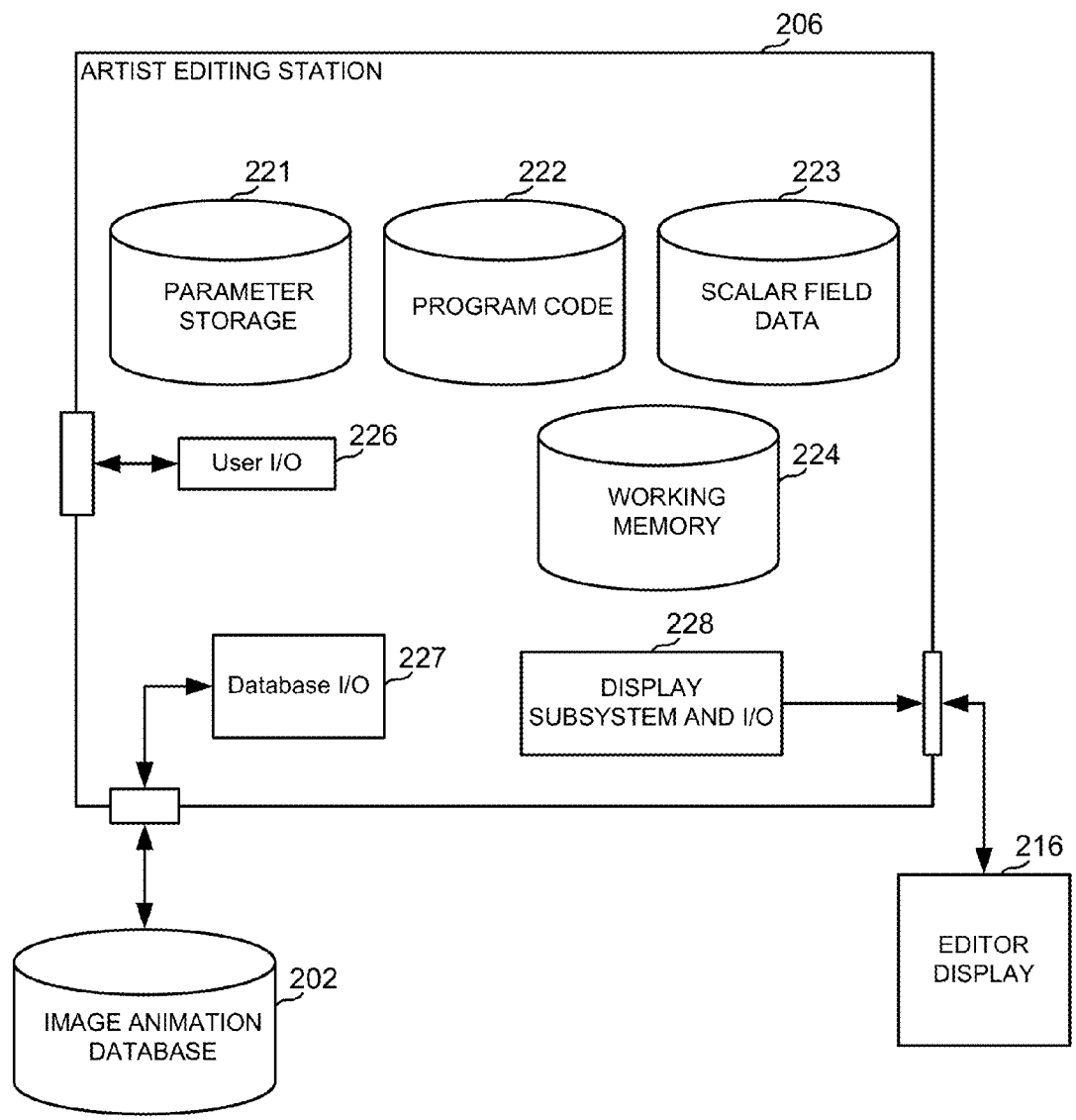
FIG. 3 illustrates elements of an editing station in greater detail.

FIG. 3 illustrates an example of hardware that might comprise artist editing station 206 of FIG. 2. In the described embodiment, artist editing station 206 is shown including interfaces to user I/O 226, editor display 216 (via display subsystem 228), and image/animation database 202 (via database I/O 227). Artist editing station 206 might be implemented on a computer that has a processor that can read/write from memory and process instructions, which memory might include, in one or more forms, parameter storage 221, program code storage 222, scalar field data storage 223, and working memory 224. User I/O devices might include a keyboard, a mouse, a tablet, etc. The interfaces and/or memory might also be used to provide the metadata about images, animation sequences and the like.

In various embodiments, editor display 216 may be embodied as a CRT display, an LCD display, a plasma display, a direct projection or rear projection DLP, a microdisplay, or the like. In various embodiments, editor display 216 may be used to visually display user interfaces, images, or the like as well as being part of an interactive environment that accepts artist inputs, shows results of animation generation and metadata, etc. and accepts further input.

In various embodiments, user input devices include a computer mouse, a trackball, a track pad, a joystick, wireless remote, touchscreen, drawing tablet, or the like. User input devices typically allow a user to select objects, icons, text and the like that appear on the editor display 216 via a command such as a click of a button or the like as well as indicating (i.e., "painting" or "embedding") the particulars of a paint stroke, etc.

Other interfaces (not shown) might exist as well, such as an Ethernet card, a modem (telephone, satellite, cable, ISDN), (asynchronous) digital subscriber line (DSL) unit, FireWire interface, USB interface, and the like. For example, computer interfaces may be coupled to a computer network, to a FireWire bus, or the like. In other embodiments, computer interfaces may be physically integrated on the motherboard of a computer and/or include software drivers, or the like.

The storage might be implemented as one or more of random access memory (RAM), disk drives, etc. RAM or other memory might hold computer instructions to be executed by one or more processors as a mechanism for effecting some functionality described herein that is implemented in software.

RAM and disk drives are examples of computer readable tangible media configured to store embodiments of the present invention including computer executable code implementing techniques described herein, data such as image files, object/scene models including geometric descriptions of objects, images, metadata about images and user inputs and suggestions, details and parameters of 3D scalar fields, procedural descriptions, a rendering engine, and/or the like. Other types of tangible media may include magnetic storage media such as floppy disks, networked hard disks, or removable hard disks, optical storage media such as CD ROMS, DVDs, holographic memories, and/or bar codes, semiconductor memories such as flash memories, read only memories (ROMS), battery backed volatile memories, networked storage devices, and the like.

In various embodiments, image generation system 200 may also include software that enables communications over a network such as the HTTP, TCP/IP, RTP/RTSP protocols, and the like. Other communications software and transfer protocols may also be used, for example IPX, UDP or the like.

In some embodiments, a graphical processor unit or "GPU", may be used to accelerate various operations.

FIG. 3 is representative of a computer system capable of embodying an image editing system. It will be readily apparent to one of ordinary skill in the art that many other hardware and software configurations are suitable for use. For example, the computer may be a desktop, portable, rack mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like.

In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Stroke Placement, 3D Scalar Fields and 3D Scalar Field Editing

Using an image generation system such as image generation system 200, an artist might input strokes onto a 2D viewport, and the image generation system then embeds the strokes in the virtual 3D space by evaluating a 3D scalar field.

The 3D scalar field might be represented by a three-dimensional array of values, wherein each value defines a value of a scalar at some location in the field. That scalar is used to define implicit surfaces, proxy geometry in the 3D space, and more generally is used in the placement of strokes and/or the determination of the third dimension for all or parts of a stroke when the user input per stroke only provides specification of two dimensions for the stroke or parts of the stroke.

The 3D scalar field might be generated as a function of other objects in the virtual 3D space, or not. The 3D scalar field might be generated as function of a 3D proxy geometry that defines a scalar distance field. For example, the artist could specify that the 3D scalar field corresponds to distances along normals from a surface of a particular object. In an extremely simple case, the object is a sphere, and the 3D scalar field is a set of concentric spheres at various distances. Since 3D proxy geometries are allowed, the artist is not constrained to 3D geometries that are actually present in the virtual 3D space. In fact, the placement of strokes could be done using a 3D scalar field that does not correspond neatly (or at all) with well-defined surfaces.

The particular expression of a 3D scalar field might be thought of as an "implicit canvas" in that it need not relate to an object in a scene, but in the simplest cases, works out to be a canvas in 3D that strokes are—at least in part—painted onto or embedded into. In some cases, the 3D scalar field will define specific surfaces that are the implicit canvases, but in the general case, it might be that the 3D scalar field can be used to embed strokes in more complicated ways.

The 3D scalar field might define an implicit canvas based on a surface of a proxy geometry object, but this is not required. FIG. 12 illustrates some examples of such proxy geometries. An example of a proxy geometry is the object 1201 in FIG. 12(a). This is a proxy geometry of the angry bumble bee that also appears in FIGS. 9(a), 9(b), 10(c) and 10(d). Since object 1201 is proxy geometry, it does not need to exactly match the object it stands in for. Note, for example, that object 1201 has multiple wings for each side of the angry bumble bee, even though the actual angry bumble bee object does not have that many wings.

FIG. 12(b) illustrates other proxy geometry objects, such as a proxy cat 1202 and a proxy mouse 1203. Note that in FIG. 12(c) there is a proxy cloud 1205, a proxy ribbon 1206, a proxy wizard 1207, and a proxy genie 1208. While there is no requirement that a proxy geometry object not exactly match an actually present object, it is possible. For example, proxy wizard 1207 might well exactly match the geometry used to generate the wizard in FIG. 11(b). However, proxy geometries provide some flexibility. For example, proxy ribbon 1206 of FIG. 12(c) could be used as a surface for attaching smoke thereto, to create the smoke ribbon effect 1102 shown in FIG. 11(b), without requiring that a corresponding ribbon actually exist in the 3D geometry used to render a scene.

In addition to a 3D scalar field itself, an image generation system can also maintain some parameters that specify relationships between the paint strokes and the 3D scalar field. For example, the artist might specify a 3D proxy geometry and further specify that all strokes are to start and end a distance, d, from a surface of the 3D proxy geometry. As another example, the artist might specify that all strokes are to start where the 3D scalar field evaluates to a start value and are to end where the 3D scalar field evaluates to an end value. Image generation system 200 can then accept user input representing the paint stroke in two dimensions, i.e., where the paint stroke's projection on the 2D viewport starts and ends, and then image generation system 200 will generate the paint stroke's position in the virtual 3D space. This might or might not translate to an implicit canvas.

It should be noted that the person painting need not be the person specifying the 3D scalar field or the function that is used to place strokes in the virtual 3D space. In fact, the latter might be some computer process that determines the 3D scalar field or function.

An optimization procedure can be used to embed painted strokes into 3D space by satisfying criteria defined on the scalar field and implemented as different objective terms. Each objective term might be a quantity or expression that is evaluated by image generation system 200 as a measure of how well a particular objective has been met. Examples of some objectives and their corresponding objective terms are explained in more detail below.

In another example, the image generation system 200 has an objective term to ensure that strokes are embedded on a particular level set of the 3D scalar field. For example, suppose the 3D scalar field is the set of distances from an origin point. With that particular 3D scalar field, a level set would be the set of all points some constant distance from the origin point. Thus, the level set for the constant $L_s$ would be the sphere of radius $L_s$ centered on the origin point. Note that, since any level set value can be chosen, the artist is not restricted to painting on any particular surface. FIG. 5(a) illustrates an example of strokes that are embedded onto level sets.

Another objective term allows the artist to paint in the perpendicular direction of the scalar field, or more generally, across level sets, allowing fur, hairs, whiskers, or other effects to be created. An objective term might include artist-settable parameters. For example, the artist might specify that each stroke start on a level set of the 3D scalar field and be at a particular angle, alpha, to the level set. The artist might be provided a user interface element of the image generation system 200 that permits the artist to alter the value of alpha. FIG. 5(b) illustrates an example of an objective of having strokes begin at an angle perpendicular to a level set, whereas FIG. 5(c) illustrates an example of an objective of having strokes begin at an acute angle relative to a level set.

By formulating the optimization problem on the strokes themselves, the full scalar field need not be created and stored explicitly, leading to an efficient stroke embedding process and system. For example, instead of looking to evaluate the 3D scalar field at each point in the virtual 3D space (or even in the view frustum), the 3D scalar field might be evaluated from expressions only to the extent needed to place a stroke.

In addition to taking in input for strokes, image generation system 200 can also take in fine-scale control over an implicit canvas or proxy geometry. For example, image generation system 200 might also provide for a "sculpting" brush for creating a particular 3D scalar field and/or creating local changes in the scalar field, resulting in outward or inward protrusions along the field's gradient. Using this sculpting tool, artists can shape the geometry/canvas before painting into it, or move strokes that have already been embedded in the 3D scalar field to fine-tune the result.

Figure 4:
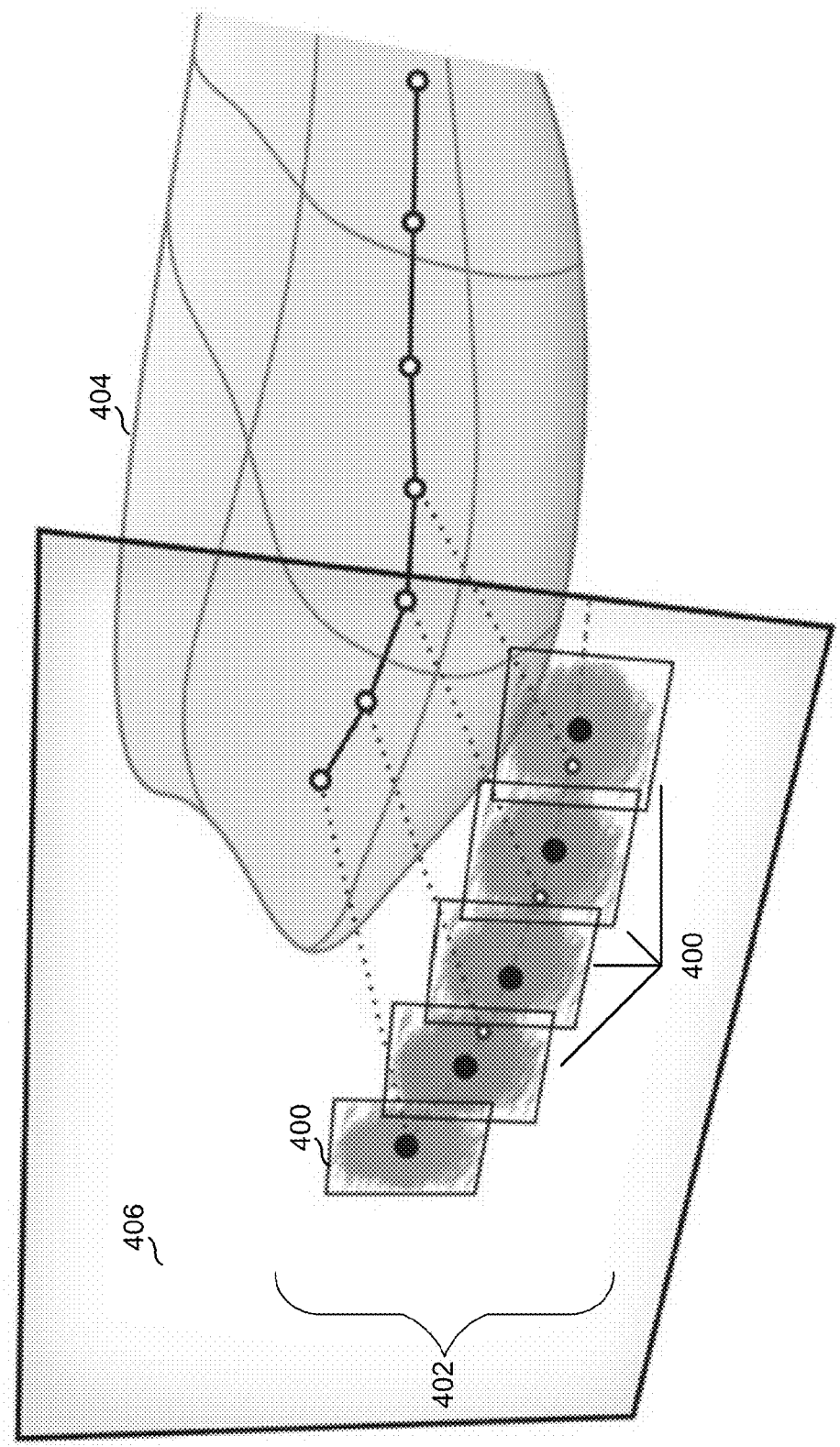
FIG. 4 illustrates an embedding operation.

For example, FIG. 4 illustrates a stroke 402 being embedded onto a 3D surface 404 after being drawn onto surface 406 using input devices of an image generation system. However, the image generation system might also accept inputs using those same input devices as part of a process of modifying 3D surface 404, as explained in more detail below.

In a simple case, an image generation system might accept user input as to the 2D position of a stroke, then determine a depth along a view ray for one, two, or more points along the stroke (specifically the centerline or some other points or lines of the stroke). The depth of a given 2D stroke point might be determined based on the 3D scalar field being used, the objective terms in use, and possibly other parameters. An example is shown in FIG. 4 and explained in more detail below.

Paint strokes may attempt to represent photorealistic aspects of a scene (i.e., attempt to convey scene elements that might appear to a viewer as being physically existing elements viewed from a real-world position) and/or represent non-photorealistic aspects of a scene, ranging from cartoonish to complex computer-generated imagery.

Canvas Representation

Internally, a drawing system might represent a 3D canvas as a scalar field f: $R^3 \rightarrow R$. As used herein, "R" may refer to the field of real numbers (often seen in "blackboard bold" font), so that $R^3$ might refer to the field of points in three dimensional space. A point, x, with f(x)=1 is said to lie on level l. The corresponding implicit surface at level l, also called an isosurface or a level set, is the set of all points $x \in R^3$ such that f(x)=1.

Where a proxy object is present, the scalar field relates the points in space to the surface of the corresponding proxy object. A proxy object is defined by a triangle mesh that forms a closed manifold solid. The scalar field can be initially defined by signed Euclidean distances to the proxy geometry's surface.

By one convention, f(x) will be negative for points inside the proxy geometry, zero for points on the proxy geometry's surface, and positive for points outside the proxy geometry. The field normally encodes the signed Euclidean distance to the proxy geometry's surface. However, a sculpting tool can inflict direct, localized changes to the field values so that they no longer represent distances. In either case, in some embodiments, the scalar field is only $C^0$ continuous. This property typically has no negative influence on the stroke embedding with the objective terms and tools used. Where objective terms were introduced that are more sensitive to the scalar field smoothness, a scalar field formulation with higher order continuity, such as the one described by [Peng] might be used.

FIGS. 14(a)-(d) illustrate example representations of scalar fields with localized changes to the field values. In each of these figures, field values are represented by color shaded regions separated by isosurfaces (although, since the figures are 2D images, only cross-sections of the regions and isosurfaces are shown, by the colored regions and bounding circles, respectively). In the figures, positive values are in red, such as region 1402 far from the center of the concentric circles of FIG. 14(a) and negative values are in blue, such as region 1404 near the center of the concentric circles of FIG. 14(a).

Figure 14A:
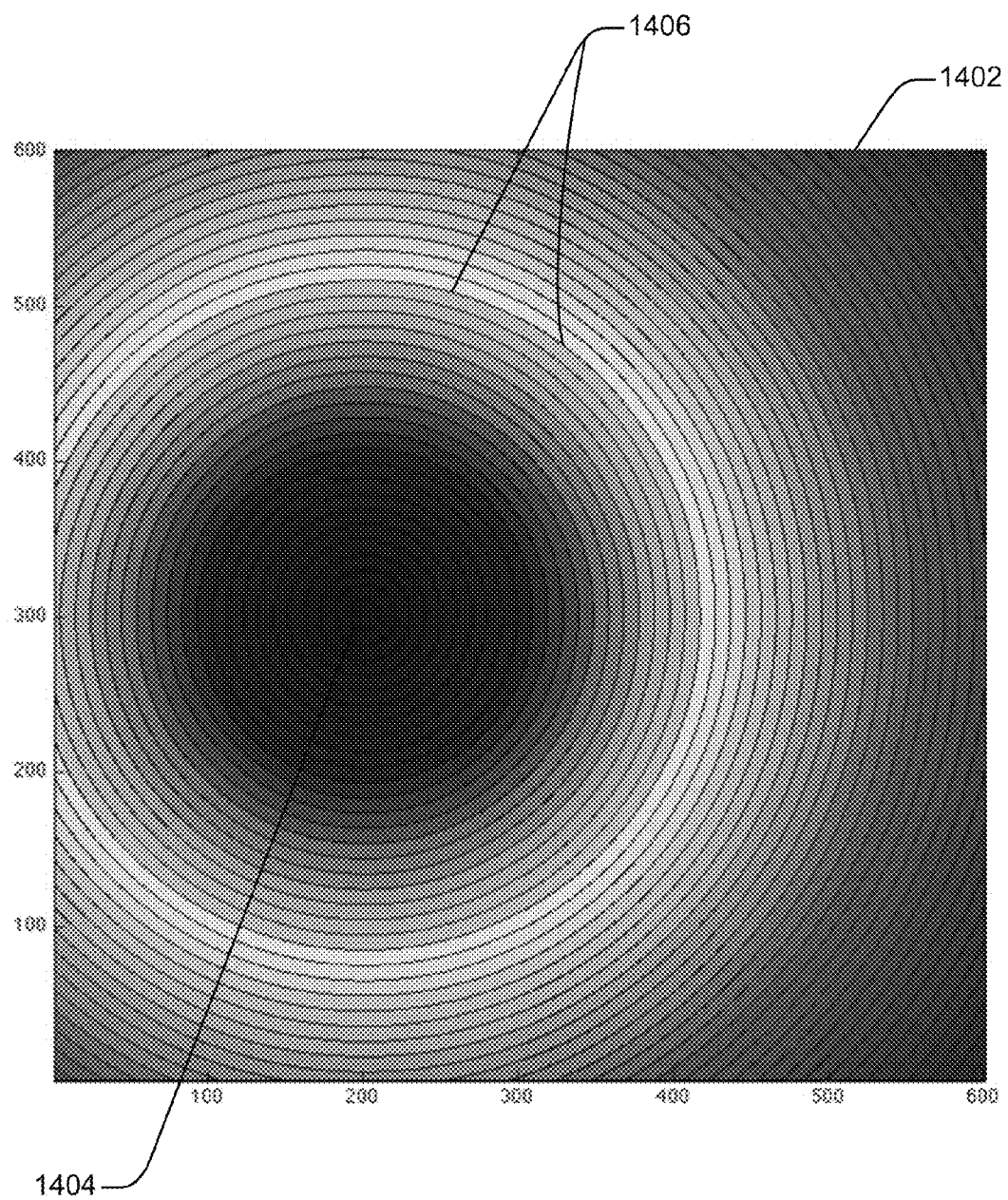
FIGS. 14(a)-(d) illustrate representations of views of various scalar fields.

FIG. 14(a) might be used to represent a scalar field that corresponds to distances from a surface 1406 (shown in the figure as a curve). In such a scalar field, the scalar field value at any given point in the 3D space is equal to that point's distance from a closest point on surface 1406, positive if it is outside the volume defined by the surface, negative if the point is inside the volume. In this example, assume that surface 1406 is a sphere, so that each isosurface is also a sphere. However, it should be apparent that many other surfaces are possible and the scalar field values can correspond to distance.

Figure 14B:
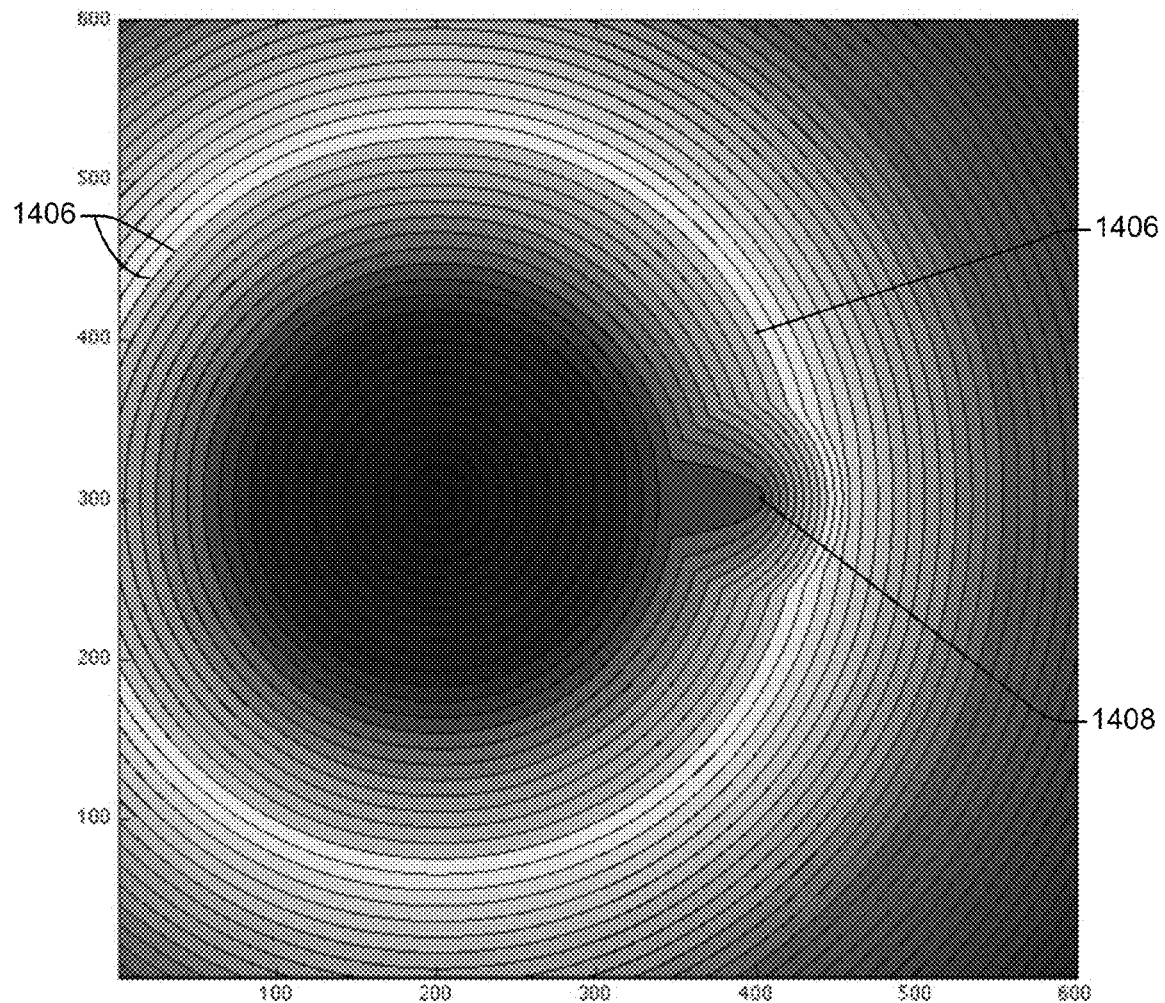
Figure 14C:
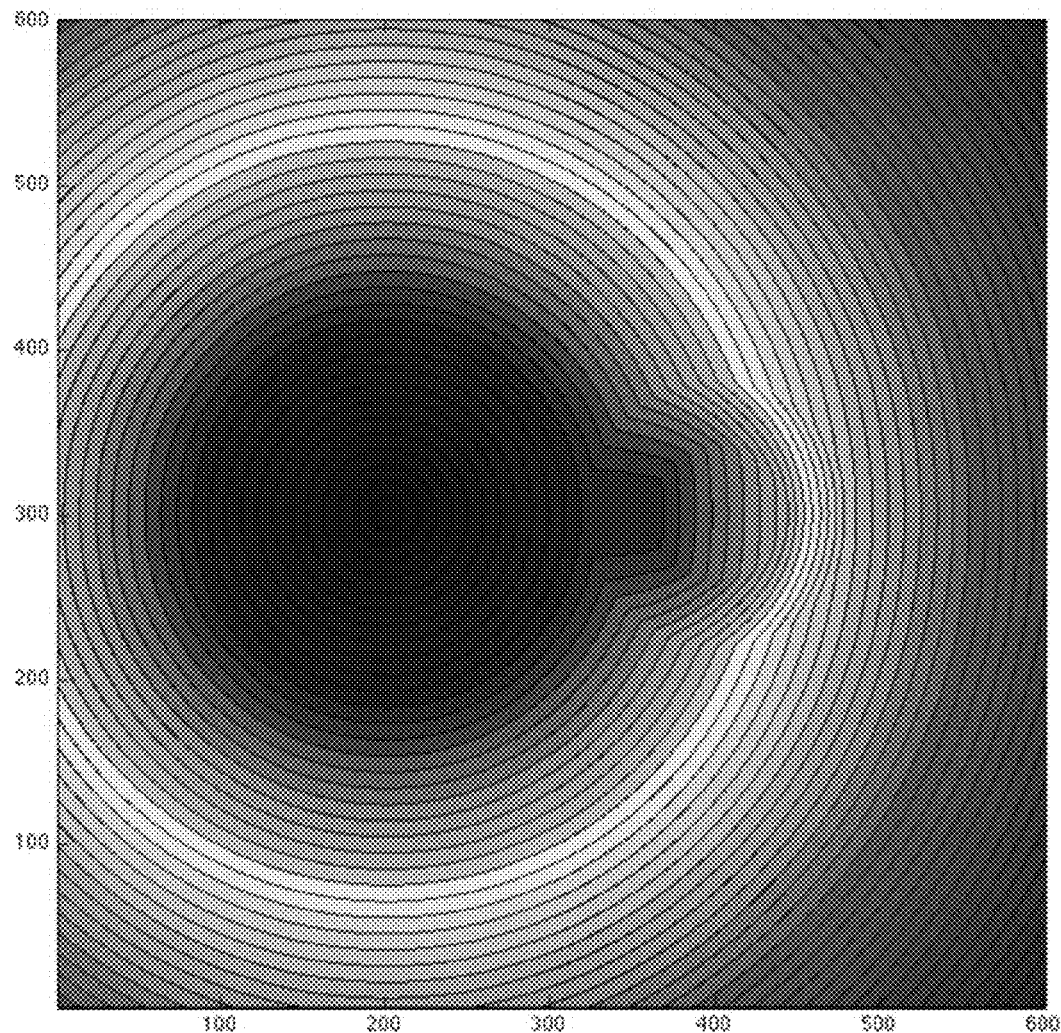
Figure 14D:
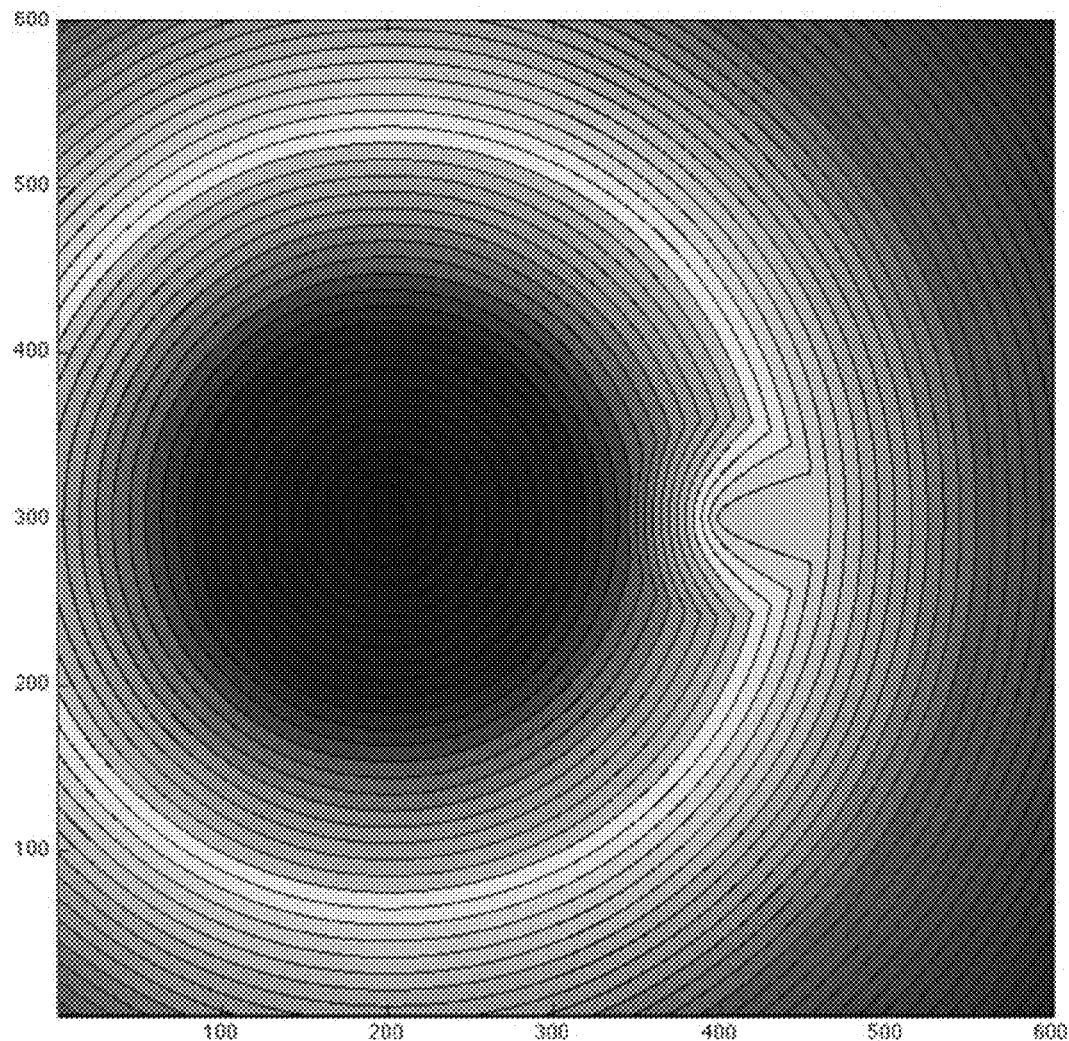

FIGS. 14(b)-(d) illustrate different scalar fields, wherein localized modifications are done, as described in more detail below.

These operations on the scalar field can be done (see below) in a form that does not require explicit storage of the field values, to avoid the memory and computational costs of a voxel decomposition or the algorithmic complexity of more sophisticated distance-field representation methods.

Painting Representation

The drawing system provides a representation of a 3D painting with a data structure that stores essential and/or available input information associated with a painted stroke. This information can include the stroke's centerline (embedded in 3D space), the brush shape and color, and additional information such as pen pressure or velocity, if available. The centerline of a stroke can be stored as a sequence of points referred to herein as "stroke points." Position and variable parameters can be interpolated linearly between the stroke points, thus forming a polyline. With this information, the painting can be reproduced faithfully from the original view point by playing back all painting operations. This repainting procedure corresponds to rendering in examples herein. Due to the 3D nature of the canvas, the system can render the painting from any other vantage (view) point.

In selected embodiments, in order to match the feel of traditional 2D digital painting, paint strokes may be rendered in 2D on the view plane as flat brush strokes, much like traditional 2D raster painting software might draw them. An example of this is shown in FIG. 4, wherein a stroke 402 is represented by a set of splats on a view plane 406 and the splats are embedded using proxy geometry 404. Stroke centerlines are first projected from their embedded 3D locations onto the current view plane. The drawing system can then render the strokes by compositing a brush splat texture 400 along the stroke 402 into the image, as illustrated in FIG. 4. If the distance between splats 400 is small enough, the splats will appear as one smooth stroke. At paint time, the width of a stroke can be defined in screen space. When rendered from different view points, this width is perspectively transformed to maintain its size relative to the location in space at which it was embedded.

Since a perspective projection is used to transform the paint strokes from 3D to 2D (assuming the ultimate rendering is a 2D projection of the 3D scene), the screen size of painted objects will change as they undergo 3D transformations. The drawing system therefore can scale the size of the splats according to the difference in depth between its locations in camera space at paint time and at render time.

FIG. 4 illustrates how paint strokes might be stored in 3D in a parametric representation. For rendering, their centerlines are projected to the view plane and sampled with brush splats 400. The open circles in FIG. 4 represent stroke points, while closed circles are sampled splat locations.

Hardware and Software for Paint Stroke Input, Presentation and Manipulation

Operations of 3D painting software will now be described, which can be implemented using a general purpose computer (e.g., artist editing station 206 in FIGS. 2-3), but for readability, the example refers to a drawing system or a 3D drawing system. It should be understood that such a system includes some hardware and/or software stored on tangible media.

Such software would consider 2D user inputs, a 3D scalar field represented in memory, objective terms, and other parameters. The software can then manipulate paint strokes (and possibly other elements) and represent/place them in a 3D space. A stroke-based renderer might be used to generate temporally coherent expressive imagery, such as the cat's fur in FIG. 1, the scenes in FIGS. 9-10 and elsewhere in the figures. The imagery can be entirely independent of any objects in the space, their corresponding surfaces or other features.

A 3D scalar field might be defined with reference to particular objects in a scene, or only to 3D proxy geometry, or independent of any geometry. Commercial modeling packages, such as Maya, Mudbox, or ZBrush could be used to create some 3D proxy geometry. Proxy geometry refers to geometry that is not rendered in the final image.

An artist can sculpt proxy objects with a modeling package and import them into a scene as triangle meshes. FIG. 12 illustrates some triangle meshes. The proxy objects define the overall 3D layout of the scene but need not exhibit fine geometric details if they only serve as a guide for stroke embedding. They also need not be rendered in the final painting. Each proxy object implicitly defines a signed distance field that, conceptually, represents the object's 3D canvas. The software can provide the user with a set of tools to embed paint strokes into the 3D canvas. To paint, an artist might select a proxy object and then paint into the canvas using a familiar 2D painting interface. The painted strokes are embedded in 3D space by solving an optimization formulated in terms of the scalar field and perhaps also objective terms, as explained in more detail below.

The software used can provide the artist a choice of tools to activate different objective terms, giving the artist control over the embedding process. For example, the artist might be able to control whether adhering to a level distance is a strong or weak objective relative to other objectives. An additional sculpting tool might allow the user to make localized modifications to the scalar field using the same embedding procedure, i.e., rather than painting strokes, the user is modifying the 3D scalar field. In this way, the painting interface can be used for both coloring the canvas and for manipulating the shapes. In both cases, they are instances of the user specifying two dimensions for an input (whether a stroke or a modification of the scalar field) and having the system provide the third dimension, possibly based on some high-level parameter specifications of the user. This allows for a natural input, without the user having to explicitly specify the third dimension everywhere.

The following sections describe details of an example drawing system that can be part of a larger image generation system (that might do other image manipulation that is not considered "drawing" per se).

In some embodiments, for flexibility and extensibility, an editing station (such as artist editing station 206 in FIGS. 2-3) that operates these tools with users might represent the embedding process as a mathematical optimization process that assigns a depth value to each point of the input paint stroke. Objective terms and constraints are then used in varying combinations to obtain different embedding behaviors, such as the different behaviors illustrated in FIG. 5. These combinations can be encapsulated and presented to the user as a set of different embedding tools, such as a tool to paint at a certain distance to the object (e.g., FIG. 5(a)), or to paint strokes that are perpendicular to the proxy surface (e.g., FIG. 5(b)). The embedding tools can use the scalar field magnitude, sign, and/or gradient in their objective terms to establish criteria that relate any position in space to the proxy object.

One advantage of embedding paint strokes using an optimization instead of specialized heuristics (such as direct projection) is that it allows the system to gracefully handle situations where a tool's primary goal cannot be met. For example, by incorporating a regularizing smoothness term, a level set painting tool can easily handle the case where painted strokes extend beyond the level set's silhouette. A method based on direct projection would require special heuristics since, in this case, there is no surface on which to project.

An additional sculpting tool allows the user to make localized modifications to the scalar field using the same embedding procedure. In this way, the painting interface can be used both for coloring the canvas and for manipulating the shapes.

Stroke Embedding

Using the drawing system, the artist paints in a particular 2D view of the 3D canvas, generating an ordered sequence of n stroke points, $s_i \in R$. A goal of stroke embedding is to find 3D positions $p_i \in R^3$ of these points in a way that is meaningful and useful to the artist. To target an embedding algorithm that meets these workflow considerations in a flexible and extendable way, the drawing system can handle the embedding of the stroke points as an optimization problem. This framework allows for implementation of objective function terms that accomplish different embedding behaviors, such as painting on a level set of the 3D scalar field, or across the 3D scalar field's level set between two chosen level sets. Combinations of these terms are exposed to the user as different 3D embedding tools.

To ensure that the embedded strokes match the artist's intent, the stroke points $p_i$ should project back to their original screen space locations $s_i$ in the view from which they were painted. The drawing system can enforce this property strictly by parameterizing the stroke points by their view ray: $p_i = o + t_i d_i$, where o is the camera position, the view vector that passes through $s_i$ on the screen plane, and $t_i$ the ray parameter. The $t_i$ are thus the unknown variables of the optimization.

Objective Terms

In an example implementation, there are three objective terms to provide the ingredients for building the 3D drawing system's embedding tools, namely, a level distance term, an angle term, and an arc length term. These will be described in more detail. The level distance term is minimized when all stroke points are at a particular distance from the proxy geometry. The angle term minimizes the curvature of the stroke and thus smoothes its embedding. The arc length term favors straight embeddings by minimizing the total length of a stroke.

Level Distance:

The 3D drawing system allows the user to select a specific level l, and hence a specific isosurface, $f(x)=l$, on which to apply strokes. The corresponding level objective term should ensure that all stroke points are embedded as closely as possible to the selected isosurface. In the simplest case, the artist may want to paint directly on its surface, $l=0$. For added flexibility, each stroke point, $p_i$, can possess its own target level, $l_i$. The level distance objective term sums the difference between the actual field value $f(x)$ evaluated at all point locations $p_i$ and the desired level l. The level distance term is illustrated in Equation 1.

$$E_{level} = \sum_{i=1}^{n} (f(p_i) - l)^2 \qquad \text{(Eqn. 1)}$$

Angle:

The angle objective term aims to minimize the directional deviation of consecutive line segments along a stroke. This deviation can be measured by the dot product between the normalized line segments, which equals one when the segments are co-linear. The angle objective term measurement is illustrated in Equation 2.

$$E_{angle} = \sum_{i=1}^{n-2} \left(1 - \frac{p_{i+2} - p_{i+1}}{\|p_{i+2} - p_{i+1}\|} \cdot \frac{p_{i+1} - p_i}{\|p_{i+1} - p_i\|}\right)^2 \qquad \text{(Eqn. 2)}$$

Arc Length:

The arc length objective term penalizes the collective length of all segments. This term can be used to regularize the influence of the angle term when the level distance term is not needed. The arc length objective term is illustrated in Equation 3.

$$E_{length} = \sum_{i=1}^{n-1} \|p_{i+1} - p_i\|^2 \qquad \text{(Eqn. 3)}$$

A goal for an embedding tool is to find ray parameter values, $t_i$, and thus 3D locations for all stroke points, that minimize the weighted sum of all objective terms. The objective function of the optimization might be as illustrated in Equation 4.

$$E = w_{level} E_{level} + w_{angle} E_{angle} + w_{length} E_{length} \qquad \text{(Eqn. 4)}$$

Individual embedding tools, described in the next sections, achieve different behaviors by setting different values for the weights $w_{level}$, $w_{angle}$, and $w_{length}$. The drawing system might use the quasi-Newton L-BFGS method to solve this non-linear optimization problem. Since the only unknowns to the optimization are the depth values, $t_i$, the optimization does not change the shape of a stroke in the view in which the stroke was painted.

Embedding Tools

Figure 5:
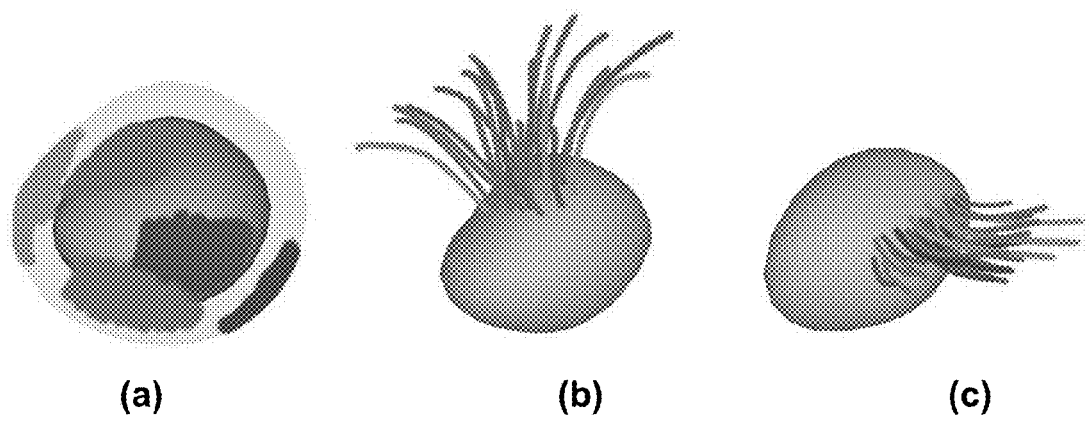
FIG. 5 illustrates examples of stroke embedding processes.

The objective terms presented in the previous section provide the ingredients necessary to implement three embedding tools. The use of these three tools is explained herein and examples of the results are shown in FIG. 5.

Level Set Tool:

The level set tool embeds all stroke points as closely as possible onto a selected level set surface. FIG. 5(a) illustrates an example of what might occur if the level set objective is the main objective. This goal is achieved by giving a dominant weight to the level distance term, $E_{level}$. By itself, this term has the same effect as direct projection for paint strokes within the silhouette boundaries of the level set. When a stroke extends outside the silhouette, the closest distance solution will be roughly perpendicular to the surface in the region where the silhouette is crossed, thus creating a sharp corner along the embedded stroke. The angle term, $E_{angle}$, (described below) can be incorporated to achieve a smoother transition in this case. The weights $w_{level}=1$, $w_{angle}=0.1$, and $w_{length}=0$ were used for the level set tool in the generation of the example image of FIG. 5(a). If a fuzzy embedding is desired, the target level can be displaced by a random amount for each stroke, or even for each individual stroke point.

Hair and Feather Tool:

Another set of tools allows the user to paint across level sets. The user selects a target level for both the start and the end of the stroke. The first and last points of a painted stroke are constrained to lie on these prescribed levels, i.e., $w_{level}=1$. The remaining stroke points, however, are optimized with $w_{level}=0$. In the abscence of a target surface, the angle objective term ensures a smooth transition between the two ends with $w_{angle}=1$. With this term alone, the resulting embedding will be smooth, but may be extended undesirably in order to meet the angle criteria optimally, resulting in strokes that overshoot the prescribed target level set. The drawing system can use the arc length term as a regularization term with $w_{length}=0.05$ to regularize this behavior and cause a straighter embedding in space.

The resulting cross-level embedding can be controlled more explicitly with additional constraints. For example, the initial direction of the stroke can be prescribed by temporarily pre-pending an artificial stroke point. This point stays fixed during the optimization of the stroke, but affects the embedding solution through the angle objective term.

Depending on its relative position to the first actual stroke point, $p_1$, it will cause the embedded stroke to leave the surface in a particular direction. For the "hair" tool, the temporary point is placed along the negative gradient direction at $p_1$, causing the initial direction of the stroke to be perpendicular to the level set. The "feather" tool was realized by placing the temporary point in the direction that is tangential to the scalar field at $p_1$ and has the largest angle to the straight line connecting $p_1$ and $p_n$.

Distance, Derivative and Gradient Computations

In some embodiments, in the process of embedding strokes in space as described below, the optimization procedure repeatedly evaluates a canvas's scalar field and calculates the field's magnitude, $f(x)$, the gradient, $\nabla f$, and the derivative of the scalar field with respect to the ray parameter, $\partial f(p_i)/\partial t_i = \nabla f \cdot d_i$.

In the absence of sculpting operations, $f(x)$ is defined to be the smallest distance to the proxy geometry, which is designated as $f_{proxy}(x)$. This distance is computed by finding the closest point within any primitive of the geometry mesh. The sign of the distance is found using the angle-weighted normals of the mesh primitives [Baerentzen]. The gradient is generally defined by the normalized vector between the query point x and its closest point on the surface. If x lies very close to or exactly on the surface, this definition becomes unstable, and the angle-weighted normal of the closest primitive is used instead.

All scalar field evaluations can be computed on the fly, so that field doesn't need to be stored in a discretized form. This might also be used in conjunction with a spatial acceleration data structure, such as an oriented bounding box tree [Gottschalk], which allows the embedding to be performed interactively.

Initialization and Refinement

To accelerate convergence and avoid inappropriate local minima, the drawings system might initialize the unknowns to lie on the front-most target level set of the scalar field using Sphere Tracing, a ray marching technique described by [Hart]. For the hair and feather tools, only the first and the last stroke points are initialized to their respective target levels, while the remaining unknowns are initialized with a linear interpolation between the two end points.

If a target surface or parts of it are at a considerable angle to the screen plane, the sampling of points along the stroke from the input device may not be sufficient for the stroke to be embedded nicely in the scalar field. For example, the level objective term can only be faithful to the chosen isosurface if the stroke sampling is fine enough for the level of detail of the surface. Likewise, the angle term can only provide an effective smoothing if the sampling is appropriate. The drawing system can be programmed to refine input strokes painted with the level set tool during their initialization. If the Euclidean distance between two consecutive stroke points after initialization is larger than a given threshold, a new stroke point is inserted halfway between the existing stroke points in 2D and immediately projected according to the initialization method described above. This step is repeated until all stroke segments are at most twice as long as the shortest segment in the stroke, thus guaranteeing a roughly uniform sampling along the stroke.

Figure 6A:
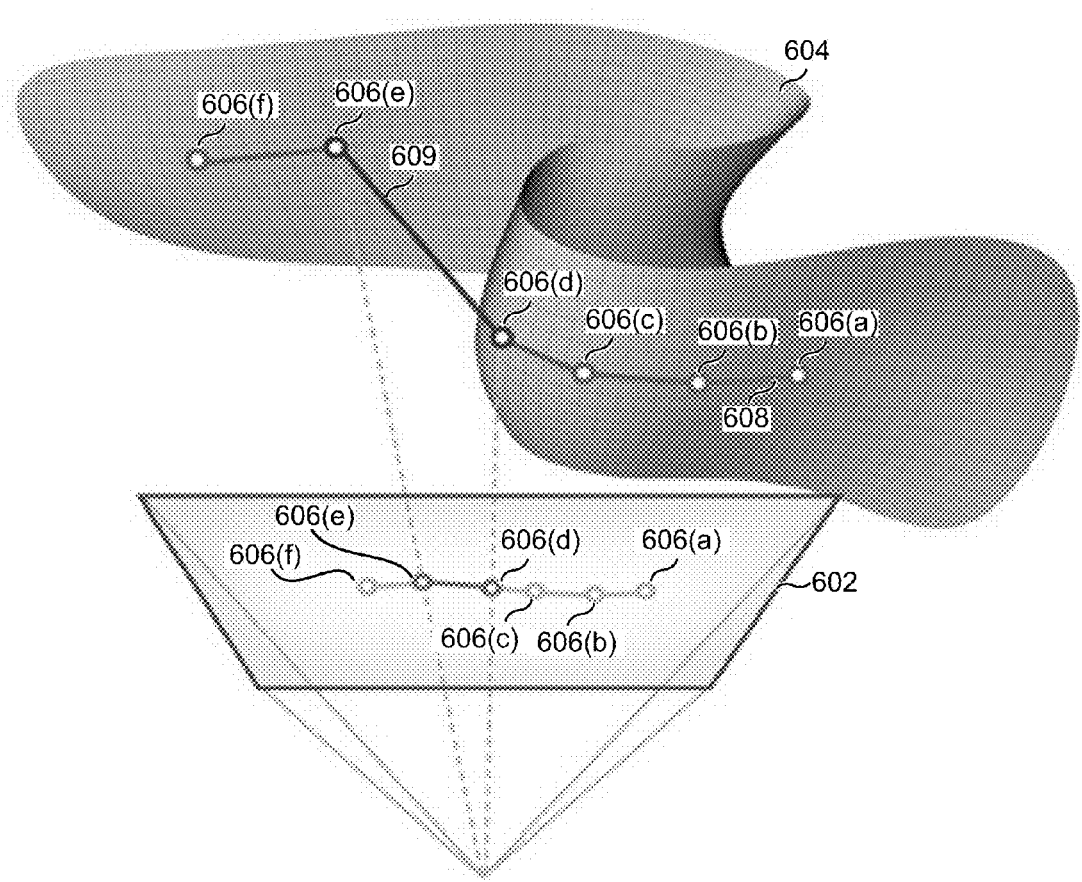
FIG. 6 illustrates three consecutive refinement steps of a paint stroke crossing an occluding contour of a target isosurface.
Figure 6B:
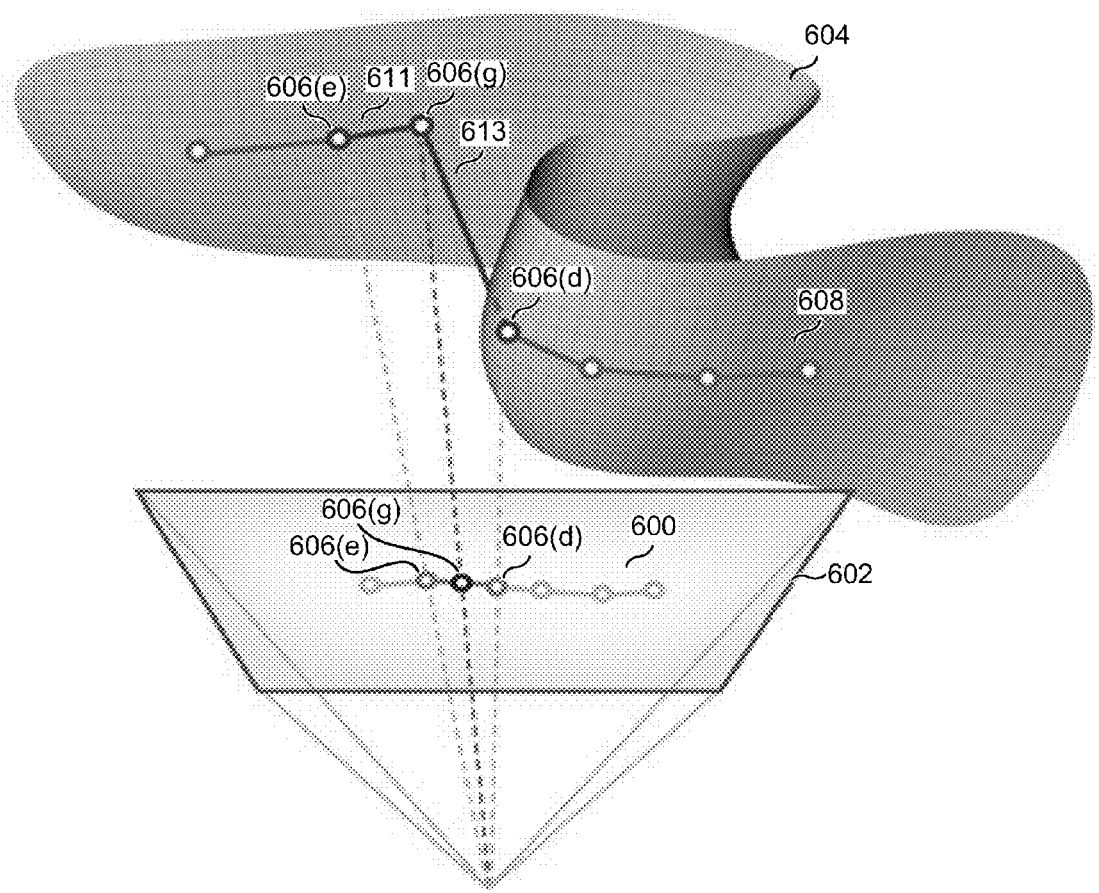
Figure 6C:
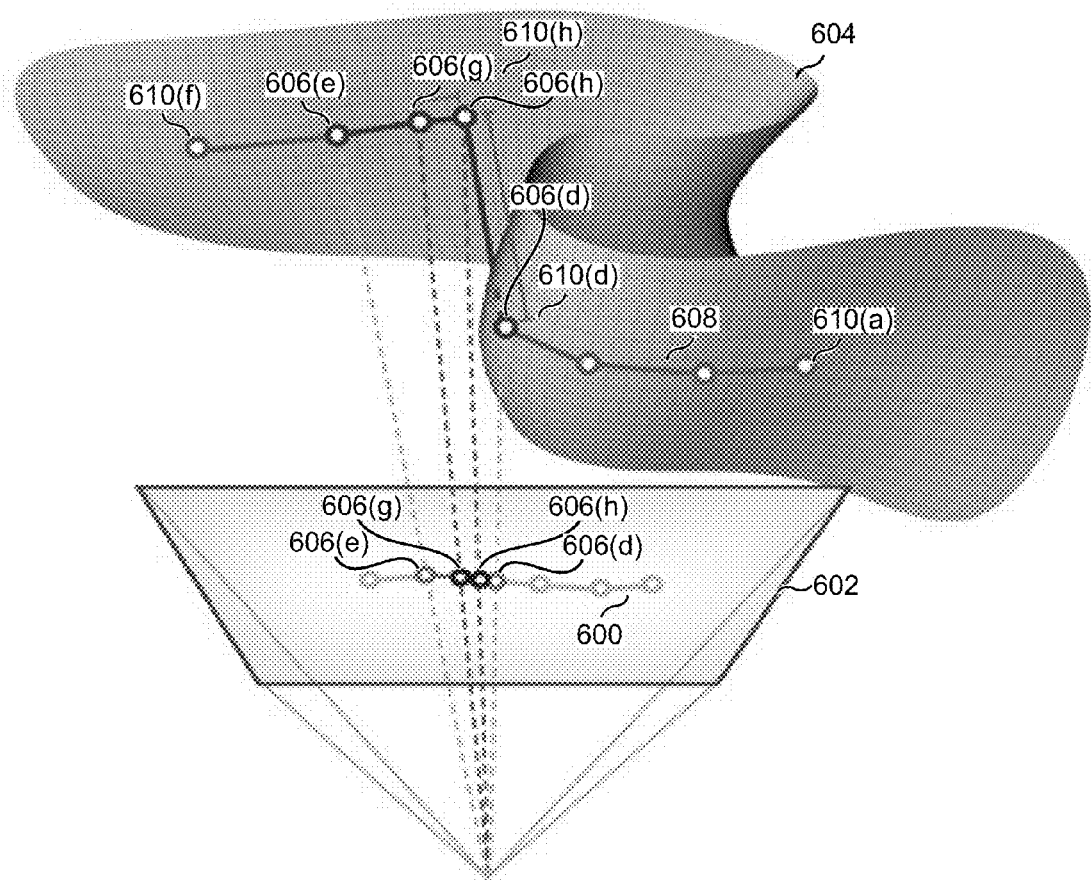

The refinement process has the added benefit of detecting strokes that cross occluding contours. This is illustrated in FIG. 6. FIG. 6 shows three consecutive refinement steps of a paint stroke 600 crossing an occluding contour of a target isosurface 604. As shown there, a stroke 600, drawn on an input plane 602 is to be embedded onto an isosurface 604. Stroke 600 is shown initially comprising stroke points 606(a), 606(b), 606(c), 606(d), 606(e), and 606(f). As illustrated, isosurface 604 has an occluding contour and an embedded stroke 608 that corresponds to stroke 600 spans that occluding contour.

Painting across occluding contours can result in stroke segments bridging two parts of an isosurface, which are potentially far apart in 3D. Attempting to refine such a segment causes an infinite recursion within a segment that cannot become any shorter. For example, stroke points 606(d) and 606(e) are far apart in 3D, so a refinement might be to insert a point halfway (measured in the input plane) between two points that are far apart. This is illustrated by inserted stroke point 606(g) shown in FIG. 6(b). Note that the points on stroke 608 corresponding to stroke points 606(g) and 606(d) are still far apart in 3D, so it might be further refined by adding in yet another stroke point 606(h). Eventually, the added points will converge at 606(d), but in 3D, they will project to two distinct 3D points (embedded points 610(h) and 610(d), in FIG. 6(c), for example).

Note that, in each step, the smaller sub-segment gets considerably smaller but the original segment might only get a little smaller, so their ratio declines. For example, as segment 609 that spans the occluding contour is refined and divided into a sub-segment along the isosurface (sub-segment 611 in FIG. 6(b)) and a sub-segment spanning the occluding contour (sub-segment 613 in FIG. 6(b)), the ratio of the isosurface portion to the spanning portion declines—the isosurface portion gets smaller and smaller, whereas the spanning portion will stay the same.

The 3D drawing system can detect this case by comparing the original segment length with the lengths of the two new segments. If the ratio is below a given threshold, the paint stroke is split into two strokes at the location of convergence, such as might occur if embedded stroke 608 in FIG. 6(c) were split into a stroke from point 610(a) to point 610(d) and a stroke from point 610(h) to point 610(f). We found that a value of 0.1 works well for the threshold ratio.

Sculpting

In the same way that paint strokes are embedded to add color to the canvas, the sculpting tool embeds sculpting strokes that alter the shape of the canvas itself. FIGS. 14(a)-(d) illustrate this. As explained above, FIG. 14(a) represents a scalar field that corresponds to distances from surface 1406 (shown in the figure as a curve). A sculpting tool might be used by an artist or user to modify the scalar field by modifying surface 1406.

FIG. 14(b) illustrates a representation of a scalar field that might result from the modification of surface 1406 wherein a "bump" 1408. Note that the outer isosurfaces are affected by the addition of bump 1408, at least in a local area. The bump might be created by a sculpting change to surface 1406, which can also cause changes in inside and outside isosurfaces, or by a change to some isosurfaces that in turn cause changes to surface 1406. In other words, a bump can be placed on the surface or not on the surface and either way, has some effect on the scalar field.

FIG. 14(c) illustrates a representation of a scalar field that might result from another modification of the scalar field, wherein a slightly different displacement is made and the scalar field is adjusted accordingly.

FIG. 14(d) illustrates the case where the scalar field sculpting is a subtraction of from a surface rather than an addition. In these examples, sculpting is shown to modify the scalar field.

Sculpting strokes act as direct modifiers to the canvas' scalar field and thus have an influence on the embedding of subsequent strokes. A sculpting stroke defines a contribution function C(r, R), where r is the smallest distance from x to any of the line segments of the sculpting stroke, and R is a user-defined radius of influence. The drawing system might use a cubic polynomial with local support, such as that described in [Wyvill] and shown in Equation 5.

$$C(r, R) = \begin{bmatrix} 2\frac{r^3}{R^3} - 3\frac{r^3}{R^2} + 1, & \text{if } r < R \\ 0, & \text{otherwise} \end{bmatrix} \quad \text{(Eqn. 5)}$$

The scalar field is modified by adding the contributions of all sculpting strokes to the field function, as in Equation 6, where j enumerates all sculpting strokes in the canvas with a non-zero contribution at x, and $K_j$ determines the magnitude and direction of each sculpting operation.

$$f(x) = f_{proxy}(x) - \sum_j K_j C(r_j, R_j), \quad \text{(Eqn. 6)}$$

The contribution functions locally change the magnitude of the scalar field gradient. The amount by which a surface is shifted by a sculpting operation therefore depends both on $K_j$ and previous sculpting operations in the region. The drawing system can maintain the magnitude of the surface deformation approximately constant by setting $K_j$ to the scalar field at a user-chosen distance in gradient direction from the stroke centerline.

Once a sculpting stroke has been embedded, it is incorporated into the evaluation of the canvas's scalar field. As a consequence, the scalar field values no longer represent the distance to the zero level set. The gradient of the scalar field is augmented by the sculpting contribution functions, as illustrated by Equations 7 and 8.

$$\nabla C(r, R) = \begin{cases} 6\frac{r^2}{R^3}\frac{\partial r}{\partial x} - 6\frac{r}{R^2}\frac{\partial r}{\partial x}, & \text{if } r < R \\ 0, & \text{otherwise} \end{cases} \quad \text{(Eqn. 8)}$$

The ray marching procedure used to find an initial embedding solution requires a lower bound of the Euclidean distance to the target level set, l, to determine its step size. If the query point x is not within the influence region of any sculpting strokes, a practical lower distance bound is the minimum between the distance to the closest sculpting stroke and $f_{proxy}$(x)−l. Otherwise, the drawing system can use a distance bound derived according to [Hart], as illustrated by Equation 9, where the lower part of the fraction is the Lipschitz constant of the signed distance field of the proxy geometry (which is equal to 1) plus the Lipschitz constant of the sum of all contributions of the sculpting strokes.

$$d(x, S) >= \frac{f(x) - l}{1 + \sum_j |K_j|\frac{3}{2R_j}} \quad \text{(Eqn. 9)}$$

To provide immediate feedback of the sculpting operations to the user, the 3D drawing system deforms a copy of the proxy geometry by moving affected vertices along their normal to the new zero level set. If necessary, the mesh is refined to account for geometric complexity added by the sculpting tool. This copy need only be used for display, while future scalar field computations use the original proxy geometry together with the sculpting stroke influence functions directly (Equation 6).

Rendering

As described above, paint strokes are rendered after projecting their centerlines onto the view plane. A small textured quad representing the paint brush is moved along the stroke and repeatedly composited into the image with the "over" operator. For each view change, the drawing system can redraw all strokes and can perform rendering at interactive refresh rates for scenes with hundreds of thousands of splats (See FIG. 13).

A complication is introduced by conflicting rules for the overlap order of paint strokes. The classic 2D painting metaphor requires paint strokes to be placed on top of each other in the order that they were originally painted. The semantics of the underlying 3D object, on the other hand, prescribe that strokes from different surfaces should be rendered in depth order. Locally, one expects strokes to be rendered in the sequence that they were painted, while globally they must adhere to depth order.

The drawing system can address this conflict by sorting all splats according to a modified depth value before rendering. This modified depth value is taken from a shifted centerpoint position, as represented in Equation 10, in camera space, where $p_k$ and $d_k$ are interpolated from the stroke points.

$$q_k = p_k + C \cdot n \cdot d_k \quad \text{(Eqn. 10)}$$

The interpolated direction represents the view rays along which the stroke points were initially embedded. The integer n is an identifier of the stroke sequence, which is increased by one for each stroke that is drawn. The stroke order is therefore translated into a depth offset, but this modified depth value is only used for splat sorting. A constant rendering parameter C scales the magnitude of the depth offsetting.

Examples of Rendering Results Using the Drawing System

Various figures illustrate results of several test 3D paintings created by users using the drawing system. For such paintings, the artists modeled approximate proxy geometry in either Maya [Maya] or ZBrush [ZBrush] and imported it into the drawing system for painting. The proxy geometry does not include fine details. Instead, the artists achieved the detailed result by painting strokes with the level set, hair, and feather tools, or sculpting additional details with the sculpting tool.

The "Cat and Mouse" painting of FIG. 1 is shown from three different viewpoints, 100(a), 100(b) and 100(c). Note that the cat's tail is depicted with strokes that do not conform to the proxy geometry's surface. By painting off surface, the artist gave the tail its rough, comic look. The whiskers on the cat and mouse demonstrate strokes painted in space using the hair tool.

Figure 7:
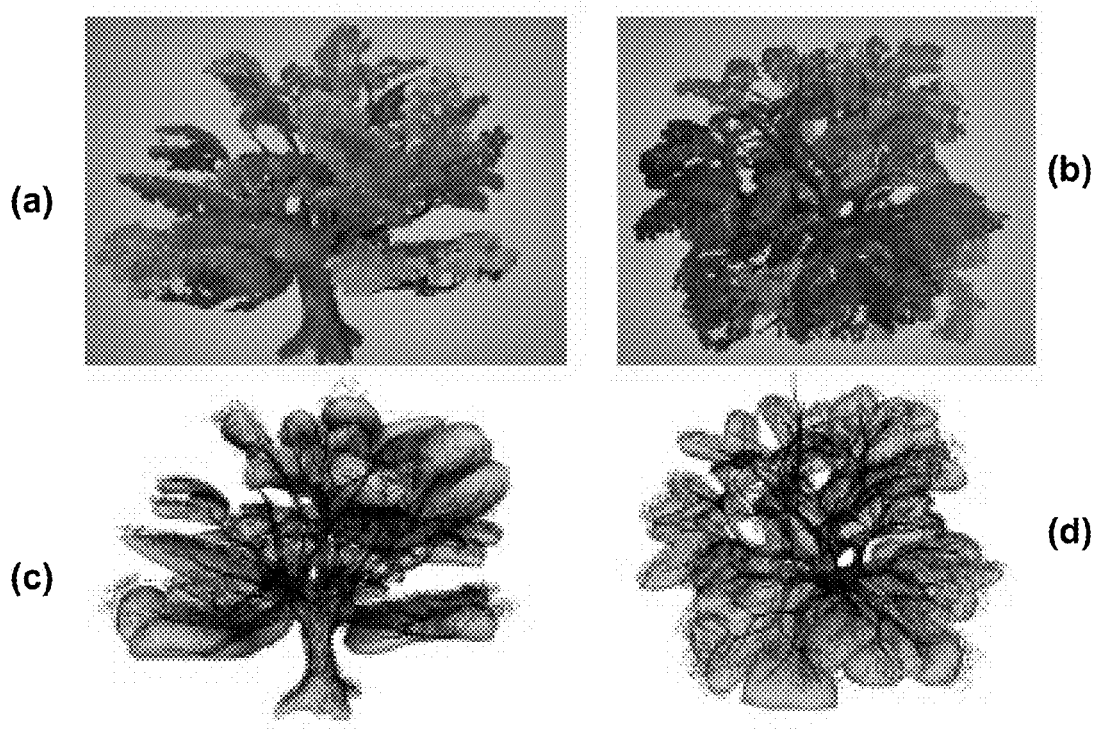
FIG. 7 illustrates a tree drawing using strokes for leaves.

FIG. 7 depicts an "Autumn Tree" from front and top views. In FIGS. 7(c) and 7(d), renderings of the stroke centerlines are blended with the proxy geometry. It shows that the leaves are painted in the space surrounding the rough canopy geometry. Leaves are individually painted strokes on offset levels of rough geometry representing canopies.

Figure 8:
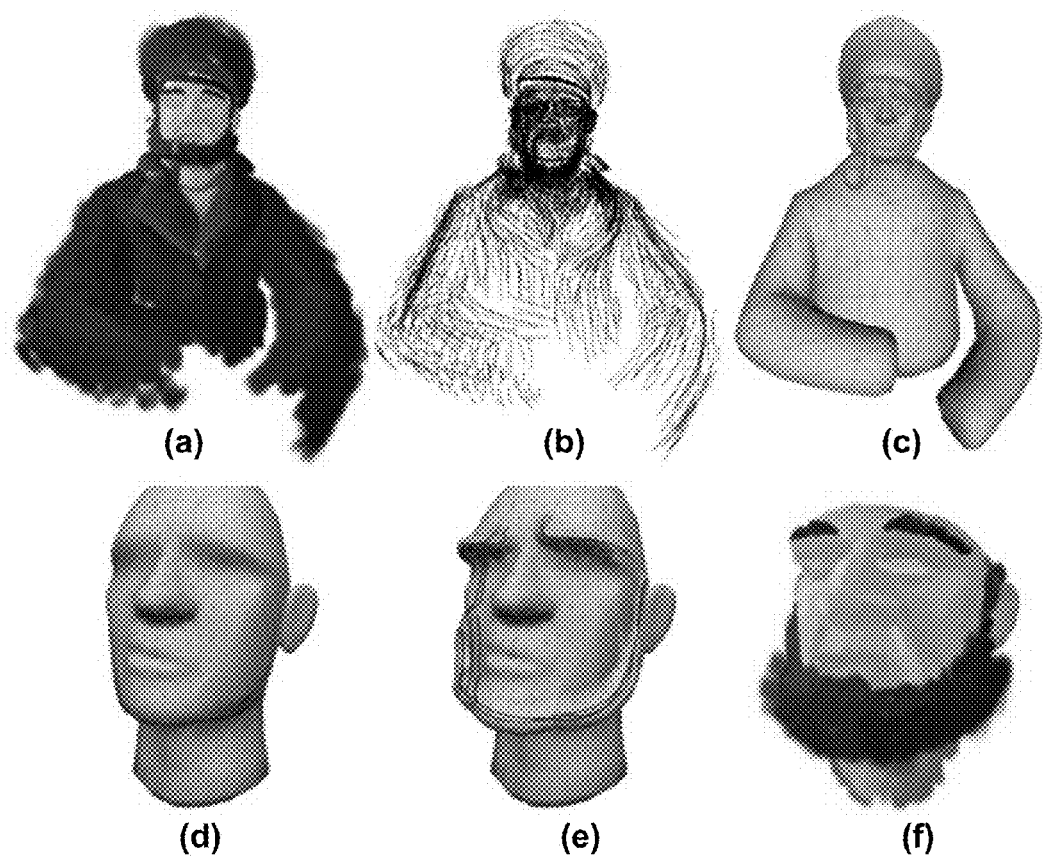
FIG. 8 illustrates hair and fur painting.

FIG. 8 depicts a captain character. The sculpting tool was used to sculpt the captain's beard and eyebrows. The bottom row of FIG. 8 (FIGS. 8(d), (e) and (f)) illustrates the original, unsculpted head, the sculpting strokes, and the final painted result, respectively.

Figure 9:
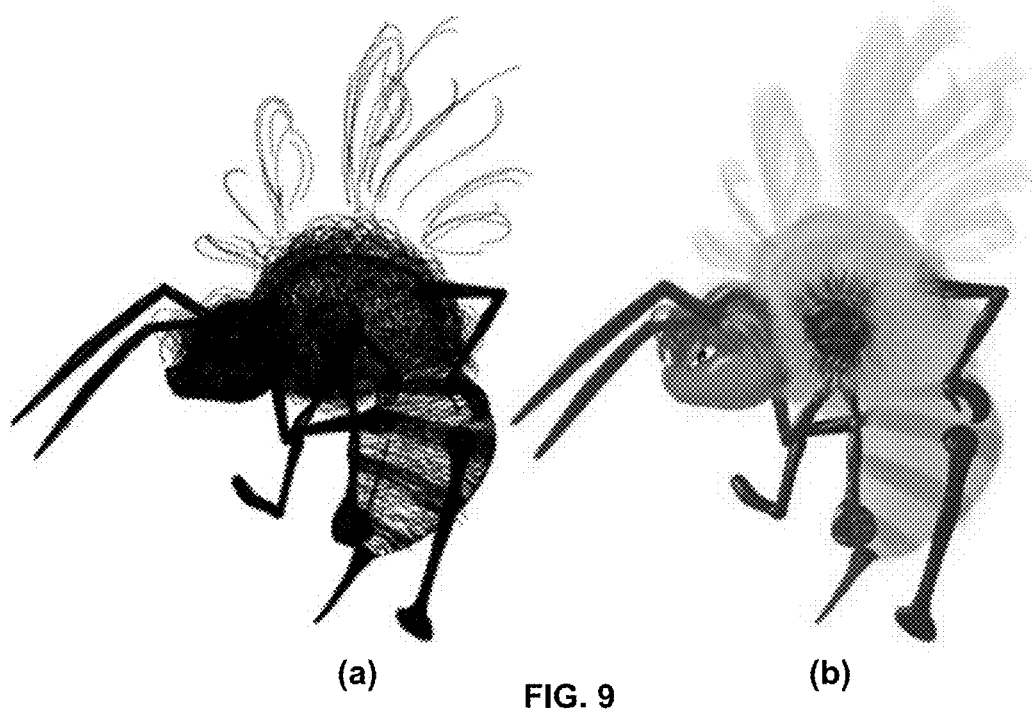
FIG. 9 illustrates other aspects of an embedding process.

FIG. 9 illustrates an "Angry Bumble Bee" character and shows how the hair and feather tools can be used to create a fluffy appearance. The drawing system can be used to create other structure that may not be easily representable using textured meshes.

FIG. 11 illustrates a "Wizard vs. Genie" painting, wherein facial features and cloth wrinkles were sculpted using the 3D drawing system's sculpting tool, and the smoke was given a fuzzy appearance by enabling the random-offset feature of the level set tool. Since the drawing system can have a unifying representation for both surface and space, it is easy to paint clouds and other volumetric effects, by painting on offset surfaces. Effects such as the clouds in these images would be difficult to achieve with texture painting techniques. The beard in the rightmost image (FIG. 11(c)) shows an exemplary use of the feather tool.

FIG. 12 illustrates proxy geometries used for various embedding operations illustrated by other figures.

Figure 10:
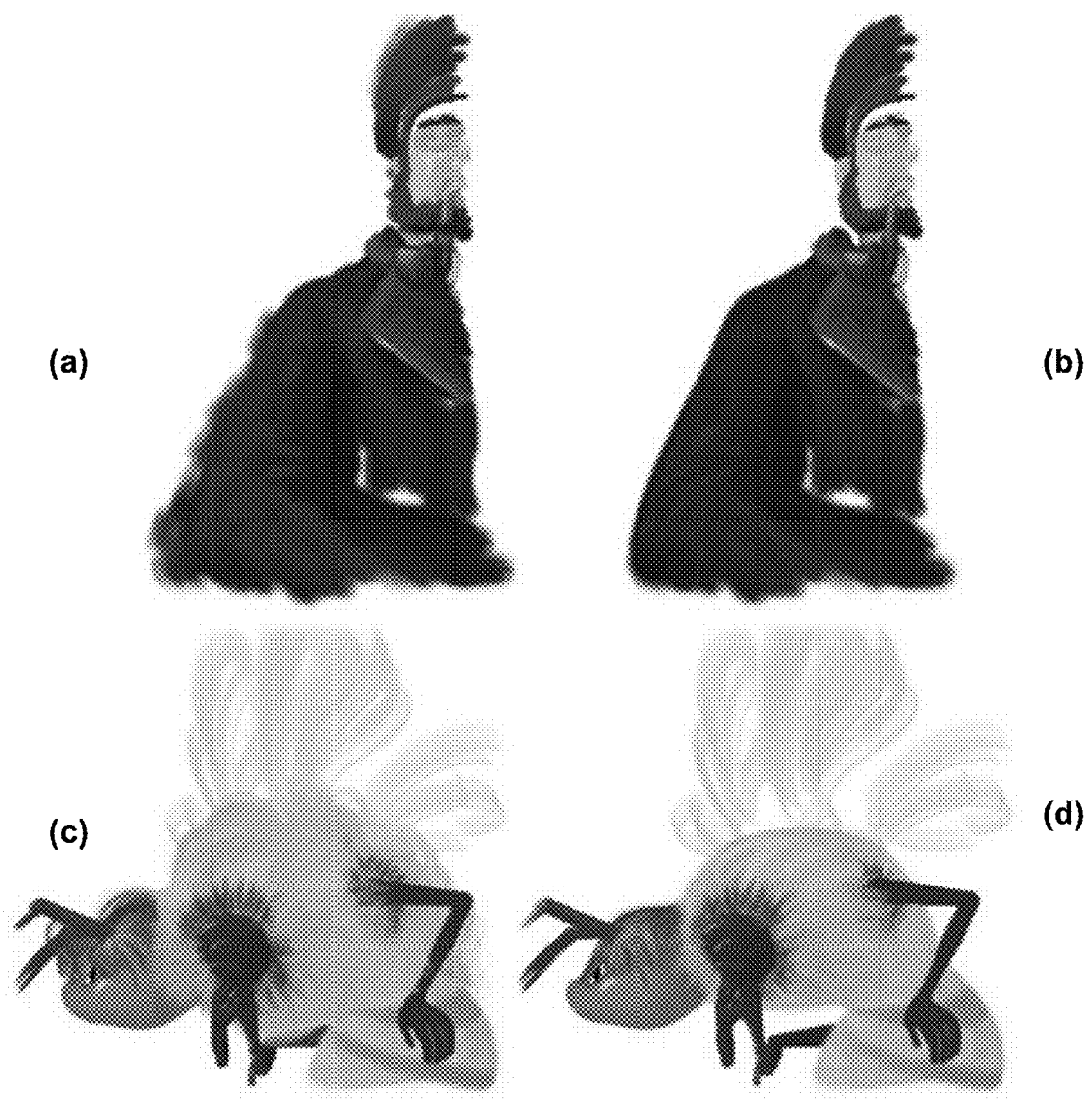
FIG. 10 illustrates other aspects of an embedding process.

FIG. 10 demonstrates some advantages over more traditional methods that restrict 3D paintings to conform tightly to the surface of scene objects. FIGS. 10(a) and (c) shows the 3D painting as created by the artist, while FIGS. 10(b) and (d) represent the paintings with all paint strokes reprojected onto the zero level set so that they lie exactly on the proxy geometry. In the reprojection, the silhouette of the captain's arm becomes a precise line without stylization, revealing the smooth nature of the underlying 3D geometry. Likewise, the bee's fuzzy body and hairstyle lose their expressive quality.

FIG. 13 is a table illustrating statistics from various test runs for image elements shown in other figures. The paintings range in complexity from 5,000 to 24,000 strokes. The "Triangle" column indicates the triangle count of the proxy geometry for each example. The "Strokes" column indicates the total number of paint strokes in the scene. The "Splats" and "Time" columns indicate the number of splats and the rendering time for a representative view rendered with 1280×720 pixels, respectively. In tests, the renderer was able to maintain interactive frame rates for each of these paintings.

Other Variations

In some variations, the artist need not paint all lighting and texture information by hand, but might include automated inclusion of scene lighting and shading information. In some variations, view-dependent geometry, such as that by [Rademacher], is incorporated into the 3D canvas authoring process. In some variations, layering, masking, and compositing are included features. In some variations, animation of paintings is possible. Paint strokes could be transformed according to animated proxy objects using space deformation techniques or by exploiting the point-to-surface correspondence given by the distance field.

CONCLUSION

We have presented a system that bridges the worlds of 2D raster painting and 3D rendering by generalizing the 2D painting metaphor to the third dimension in a way that empowers the artist to create a new class of expressive 3D paintings. An implicit canvas can be shaped by the artist through the creation of approximate proxy geometry, as well as optimization for stroke embedding. New workflows for 3D painting can be provided.

In some embodiments, animating might be painted using similar techniques. Space deformation techniques can be used to this end, or using the point-to-surface correspondence given by the distance field to transform the strokes according to animated proxy models. Some embodiments might bypass proxy model animation and allow the user to bring paintings to life by creating animations directly within the painting interface.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a computer-implemented image generation system, wherein image elements are provided to a processor for rendering into an image and wherein at least some of the image elements correspond to simulated paint strokes, a method comprising:
   receiving parameters of a three-dimensional scalar field defining a three-dimensional virtual space;
   receiving a selection of a three-dimensional object in the three-dimensional scalar field;
   receiving from an input device two-dimensional positions of simulated paint strokes;
   associating the simulated paint strokes with the three-dimensional object positioned in the three-dimensional scalar field, wherein the simulated paint strokes do not alter the shape of the three-dimensional object; and based on the three-dimensional scalar field and two-dimensional positions of the simulated paint strokes, determining depth information for the simulated paint strokes, thereby positioning the simulated paint strokes in the three-dimensional virtual space, usable as representations for image elements to be provided to the processor for rendering into an image.

2. The method of claim 1, wherein the parameters of the three-dimensional scalar field correspond to an implicit canvas distinct from objects in a scene, and wherein depth information for the strokes is determined based on intersections of the simulated paint strokes and the implicit canvas.

3. The method of claim 1, wherein the parameters of the three-dimensional scalar field define an implicit canvas that is derived from an object in the three-dimensional virtual space, and includes surface portions not coincident with a surface of the object.

4. The method of claim 1, wherein the parameters of the three-dimensional scalar field include settings for both ends of a stroke, thereby allowing each end of the stroke to be on distinct levels in a three-dimensional scalar field.

5. The method of claim 1, wherein the parameters of the three-dimensional scalar field include settings for the simulated paint strokes, including settings for level constraints, angle constraints and arc length constraints.

6. The method of claim 1, further comprising:
accepting stroke inputs for altering the three-dimensional scalar field; and
altering a stored representation of the three-dimensional scalar field as an implicit canvas having a surface modified according to the accepted stroke inputs.

7. The method of claim 1, wherein the simulated paint strokes are one or more of a brush stroke, a pen stroke, a pencil stroke, an input line, or a mark made by the user.

8. The method of claim 1, further comprising:
evaluating a level distance term for points on each of a plurality of the simulated paint strokes, wherein the level distance term represents a target distance from a proxy geometry surface;
evaluating an angle term for each of the simulated paint strokes, wherein the angle term represents an objective for curvature of one of the simulated paint strokes;
evaluating an arc length term for each of the simulated paint strokes, wherein the arc length term represents an objective for collective length of segments of one of the simulated paint strokes; and
evaluating a weighted sum of the level distance term, the angle term and the arc length term in determining the depth information for the simulated paint strokes.

9. A computer-readable medium, for use with a computer-implemented image generation system, wherein image elements are provided to a processor for rendering into an image and wherein at least some of the image elements correspond to simulated paint strokes, the computer-readable medium having stored thereon, in non-transitory form, program code, executable, directly or indirectly, comprising:
program code for receiving parameters of a three-dimensional scalar field defining a three-dimensional virtual space;
program code for receiving a selection of a three-dimensional object in the three-dimensional scalar field;
program code for accepting from an input device a plurality of input elements corresponding to simulated paint strokes, wherein the input device provides two-dimensional specifications of the simulated paint strokes;
program code for associating the simulated paint strokes with the three-dimensional object positioned in the three-dimensional scalar field, wherein the simulated paint strokes do not alter the shape of the three-dimensional object; and
program code for determining, based on the three-dimensional scalar field and two-dimensional positions of the simulated paint strokes, depth information for the strokes, thereby positioning the simulated paint strokes in the three-dimensional virtual space, usable as representations for image elements to be provided to the processor for rendering into an image.

10. The computer readable medium of claim 9, wherein the parameters of the three-dimensional scalar field correspond to an implicit canvas distinct from objects in a scene, further comprising program code for determining depth information for the simulated paint strokes based on intersections of the simulated paint strokes and the implicit canvas.

11. The computer readable medium of claim 9, wherein the parameters of the three-dimensional scalar field define an implicit canvas that is derived from an object in the three-dimensional virtual space, and includes surface portions not coincident with a surface of the object.

12. The computer readable medium of claim 9, wherein the parameters of the three-dimensional scalar field include settings for both ends of a stroke, further comprising program code for processing or storing strokes such that each end of the stroke is on distinct levels in a three-dimensional scalar field.

13. The computer readable medium of claim 9, wherein the parameters of the three-dimensional scalar field include settings for simulated paint strokes, including settings for level constraints, angle constraints and arc length constraints, further comprising program code for processing the settings for level constraints, angle constraints and arc length constraints.

14. The computer readable medium of claim 9, further comprising:
program code for accepting stroke inputs for altering the three-dimensional scalar field; and
program code for altering a stored representation of the three-dimensional scalar field as an implicit canvas having a surface modified according to the accepted stroke inputs.

15. The computer readable medium of claim 9, wherein the simulated paint strokes are one or more of a brush stroke, a pen stroke, a pencil stroke, an input line, or a mark made by the user.

16. The computer readable medium of claim 9, wherein the program code for determining comprises:
program code for evaluating a level distance term for points on each of a plurality of simulated paint strokes, wherein the level distance term represents a target distance from a proxy geometry surface;
program code for evaluating an angle term for each of the simulated paint strokes, wherein the angle term represents an objective for curvature of one of the simulated paint strokes;
program code for evaluating an arc length term for each of the simulated paint strokes, wherein the arc length term represents an objective for collective length of segments of one of the simulated paint strokes; and
program code for evaluating a weighted sum of the level distance term, the angle term and the arc length term in determining the depth information for the simulated paint strokes.

17. A drawing system for generating representations of images based in part on user inputs, comprising:

a processor for executing instructions and modifying stored data structures;

memory for storing the data structures;

a display, coupled to the processor, for providing visual representations of at least some image elements stored in the data structures, wherein at least some of the image elements correspond to simulate paint strokes;

an input device for receiving a selection of a three-dimensional object in a three-dimensional scalar field;

an input device for accepting a plurality of input elements corresponding to the simulated paint strokes, wherein the input device provides two-dimensional specifications of the simulated paint strokes;

storage for parameters of the three-dimensional scalar field defining a three-dimensional virtual space;

a module for associating the simulated paint strokes with the selected three-dimensional object positioned in the three-dimensional scalar field, wherein the simulated paint strokes do not alter the shape of the three-dimensional object a module for determining depth information for the input simulated paint strokes based on the three-dimensional scalar field; and a rendering engine for rendering images based on the image elements corresponding to the simulated paint strokes, wherein simulated paint strokes input with two-dimensional specifications are represented in a three-dimensional virtual space based on the depth information.

18. The drawing system of claim 17, wherein the parameters of the three-dimensional scalar field correspond to an implicit canvas distinct from objects in a scene, and wherein depth information for the simulated paint strokes is based on intersections of the simulated paint strokes and the implicit canvas.

19. The drawing system of claim 17, wherein the parameters of the three-dimensional scalar field define an implicit canvas that is derived from an object in the three-dimensional virtual space, and includes surface portions not coincident with a surface of the object.

20. The drawing system of claim 17, wherein the parameters of the three-dimensional scalar field include settings for both ends of a stroke, thereby allowing each end of the stroke to be on distinct levels in a three-dimensional scalar field.

21. The drawing system of claim 17, wherein the parameters of the three-dimensional scalar field include settings for the simulated paint strokes, including settings for level constraints, angle constraints and arc length constraints.

22. The drawing system of claim 17, wherein the simulated paint strokes are one or more of a brush stroke, a pen stroke, a pencil stroke, an input line, or a mark made by the user.

23. The drawing system of claim 17, wherein the module for determining depth information for the input strokes based on the three-dimensional scalar field is configured to determine positions of the simulated paint strokes based on a weighted sum of (a) a level distance term for points on each of a plurality of the simulated paint strokes, wherein the level distance term represents a target distance from a proxy geometry surface, (b) an angle term for each of the simulated paint strokes, wherein the angle term represents an objective for curvature of a stroke, and (c) an arc length term for each of the simulated paint strokes, wherein the arc length term represents an objective for collective length of segments of a stroke.

* * * * *

UNITED STATES PATENT AND TRADEMARK OFFICE
CERTIFICATE OF CORRECTION

| | | |
|---|---|---|
| PATENT NO. | : 8,988,461 B1 | Page 1 of 1 |
| APPLICATION NO. | : 13/353249 | |
| DATED | : March 24, 2015 | |
| INVENTOR(S) | : Schmid et al. | |

It is certified that error appears in the above-identified patent and that said Letters Patent is hereby corrected as shown below:

On the title page item [73] insert

--ETH Zürich (Eidgenössische Technische Hochschule Zürich), Zürich (CH)--

Signed and Sealed this
Seventeenth Day of November, 2015

Michelle K. Lee
*Director of the United States Patent and Trademark Office*